Aug. 4, 1964    C. P. CARDANI ETAL    3,142,896
STRINGING MACHINES
Filed June 15, 1961    25 Sheets-Sheet 2

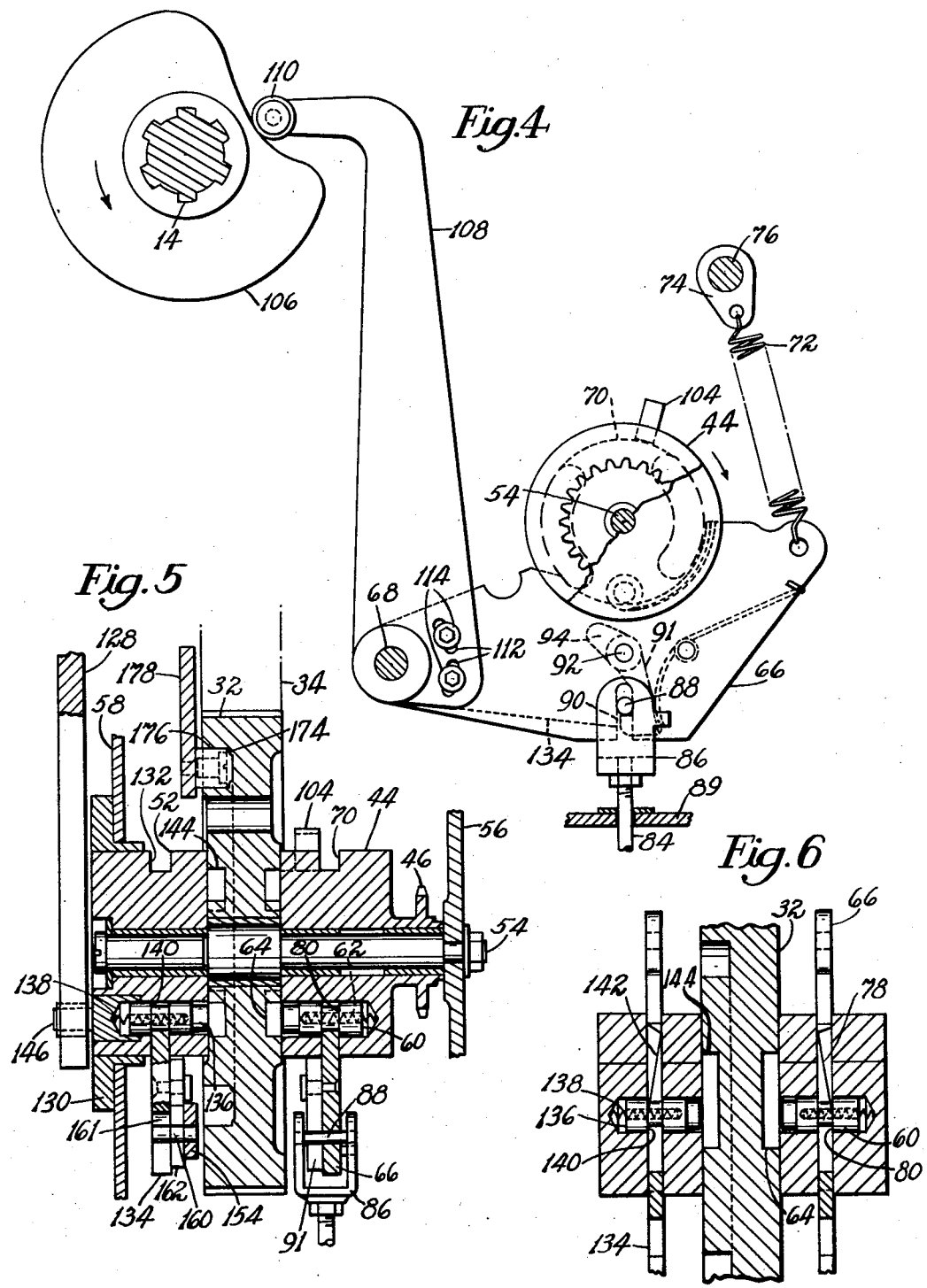

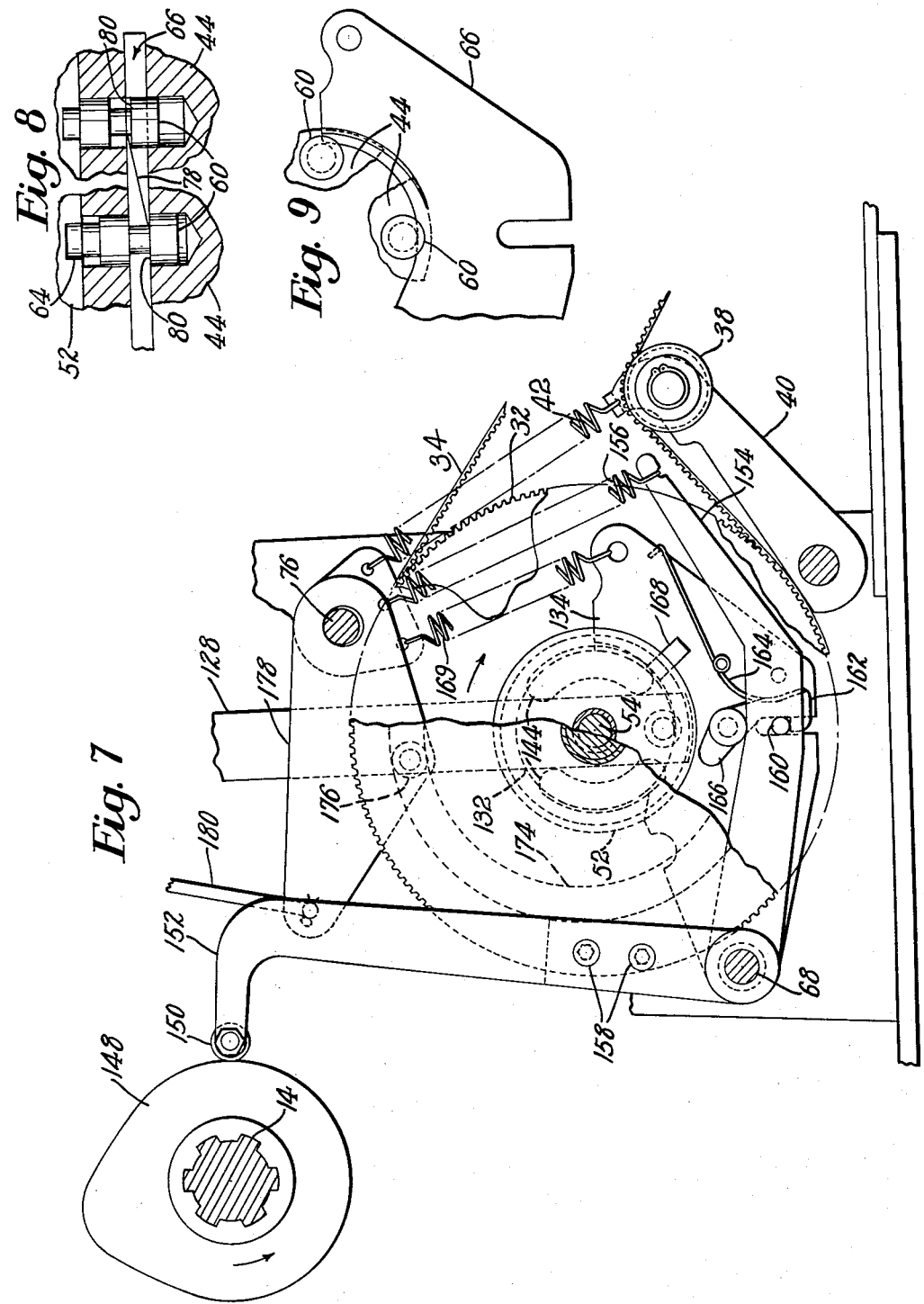

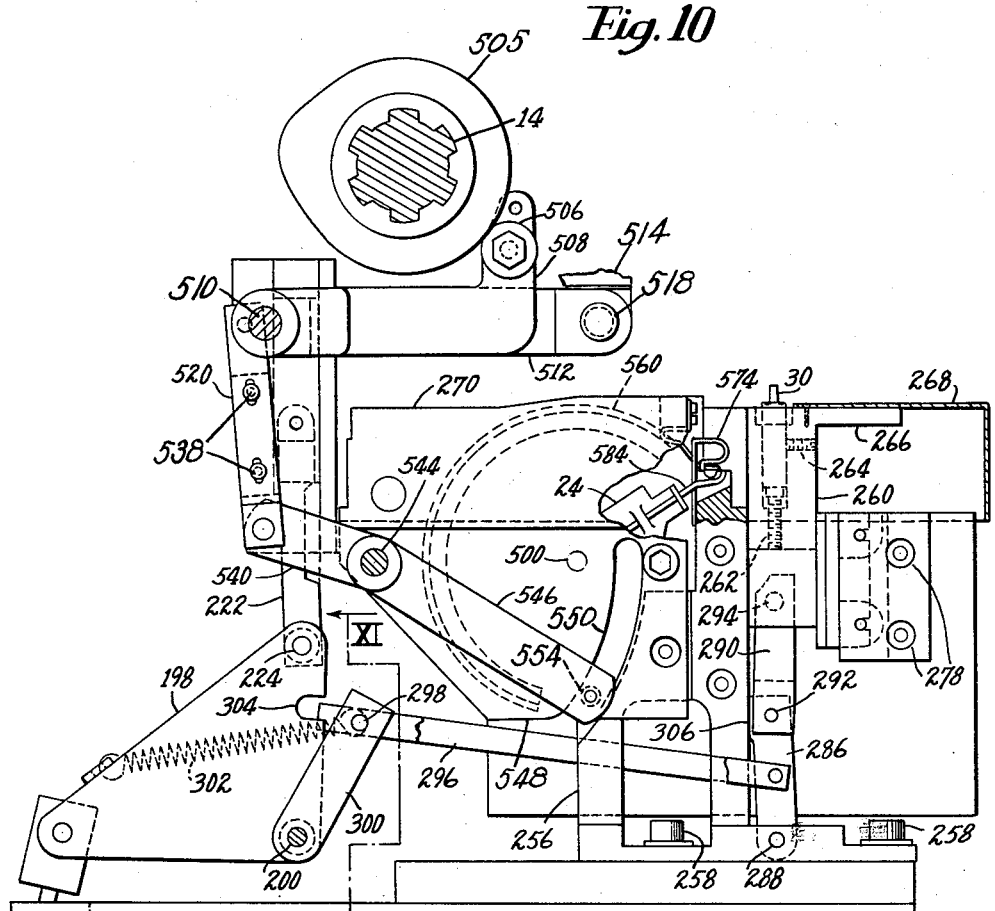
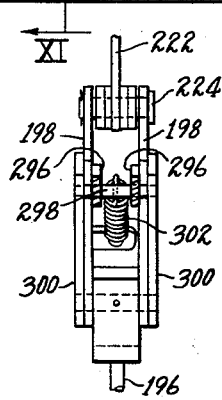

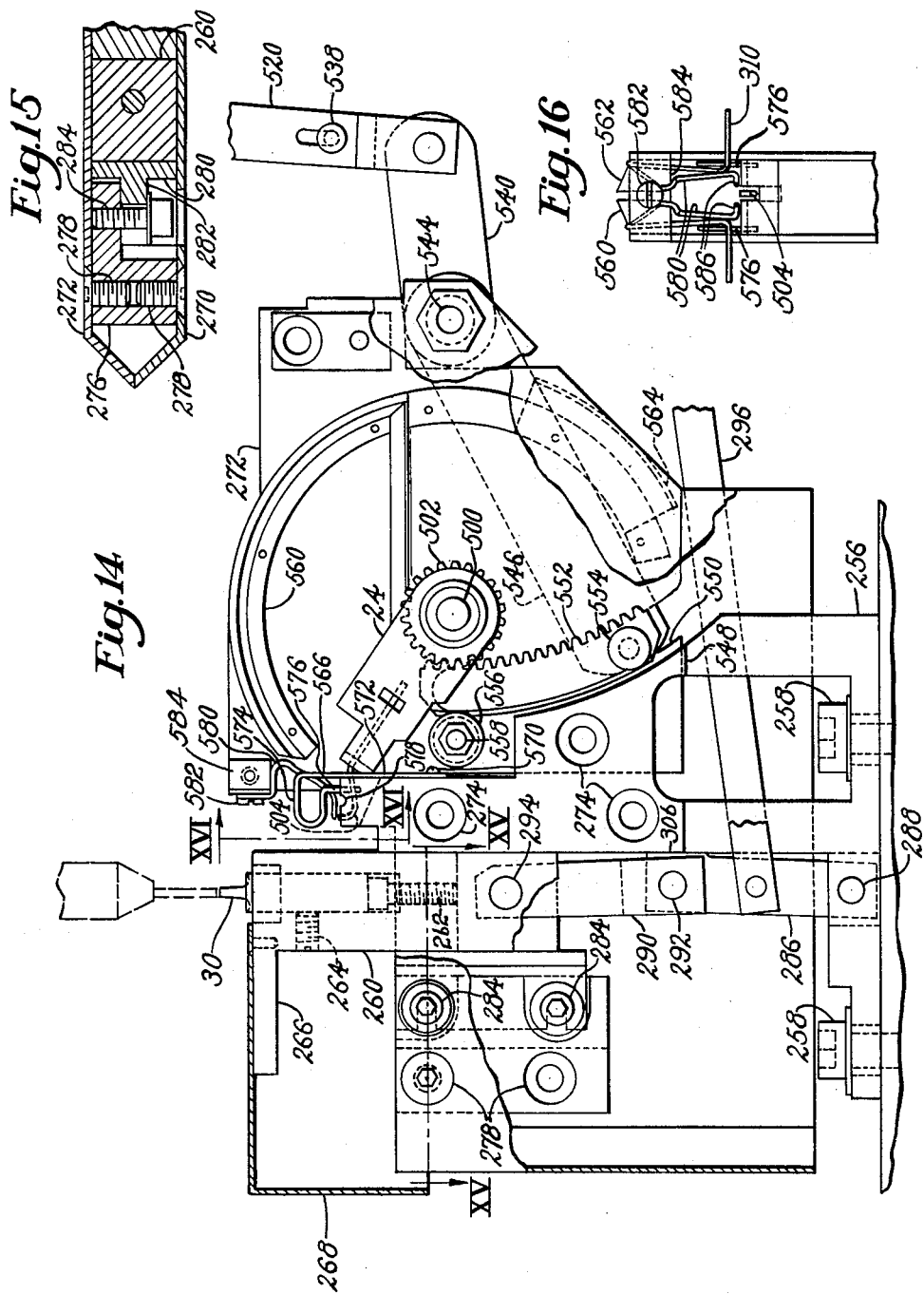

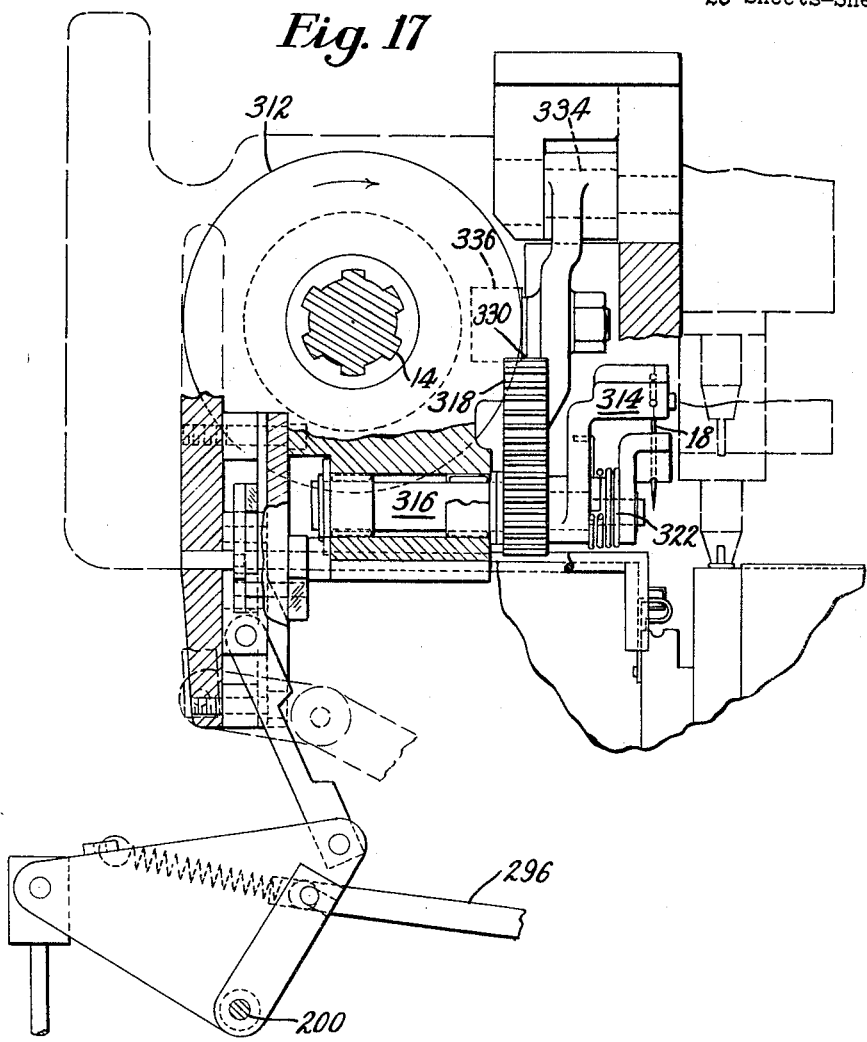

Aug. 4, 1964

C. P. CARDANI ETAL 3,142,896

STRINGING MACHINES

Filed June 15, 1961

Aug. 4, 1964  C. P. CARDANI ETAL  3,142,896
STRINGING MACHINES
Filed June 15, 1961  25 Sheets-Sheet 15
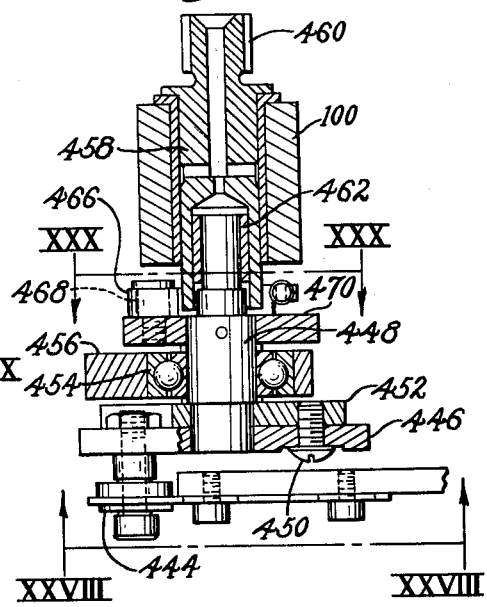
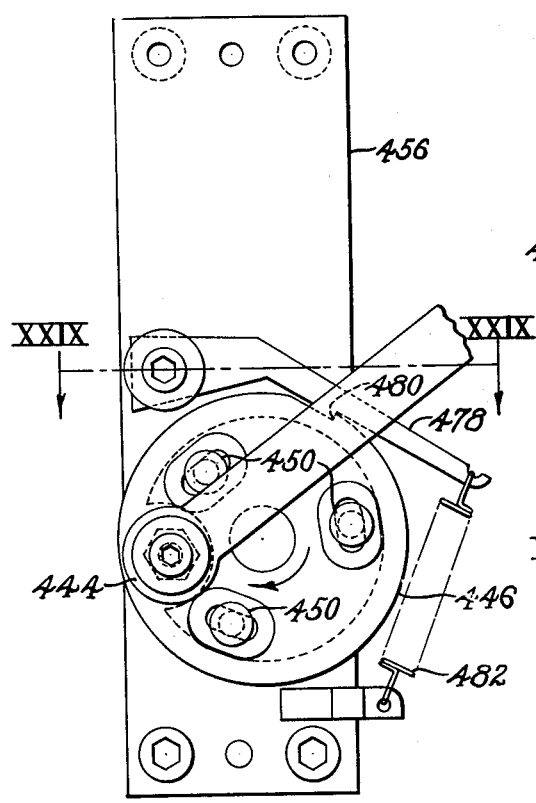
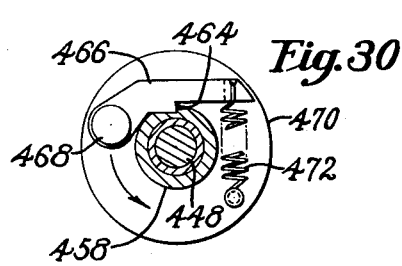
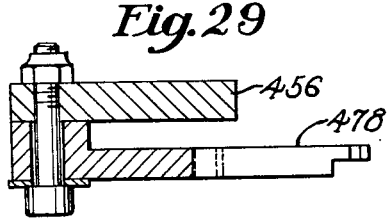

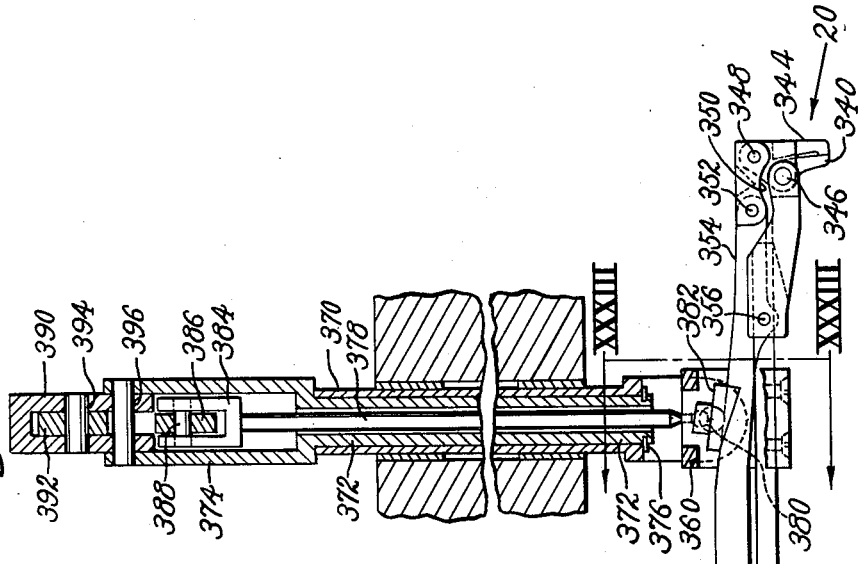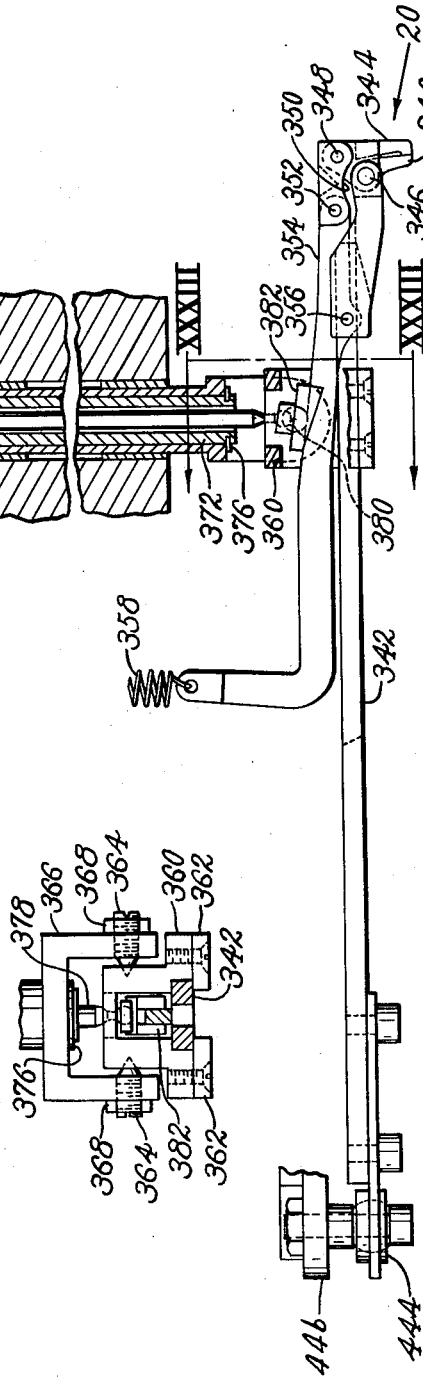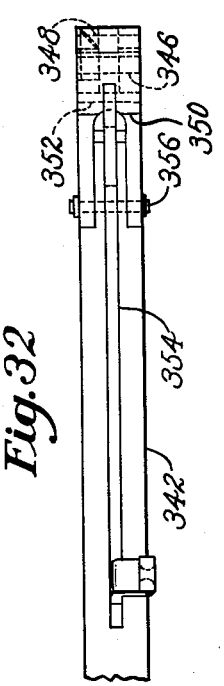

Aug. 4, 1964  C. P. CARDANI ETAL  3,142,896
STRINGING MACHINES
Filed June 15, 1961  25 Sheets-Sheet 17

Aug. 4, 1964    C. P. CARDANI ETAL    3,142,896
STRINGING MACHINES
Filed June 15, 1961    25 Sheets-Sheet 19

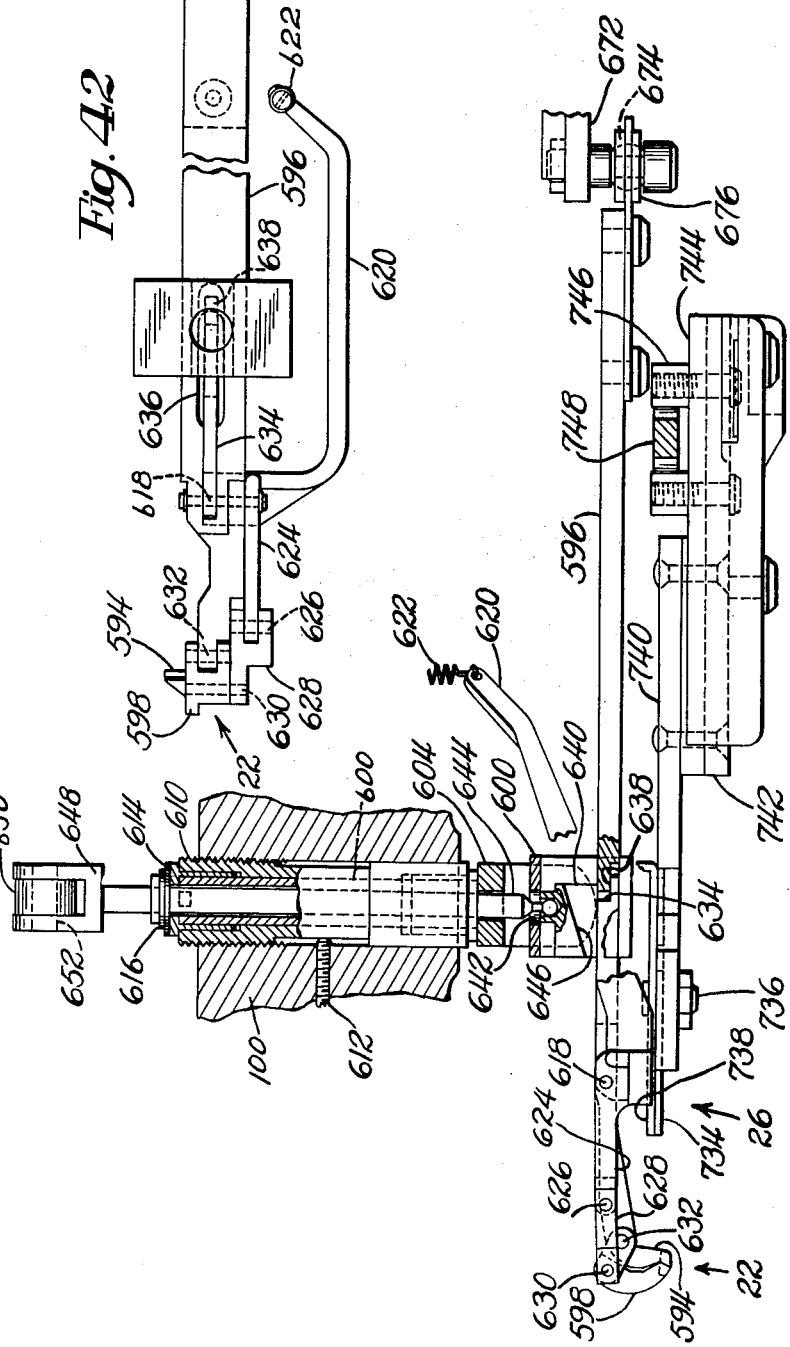

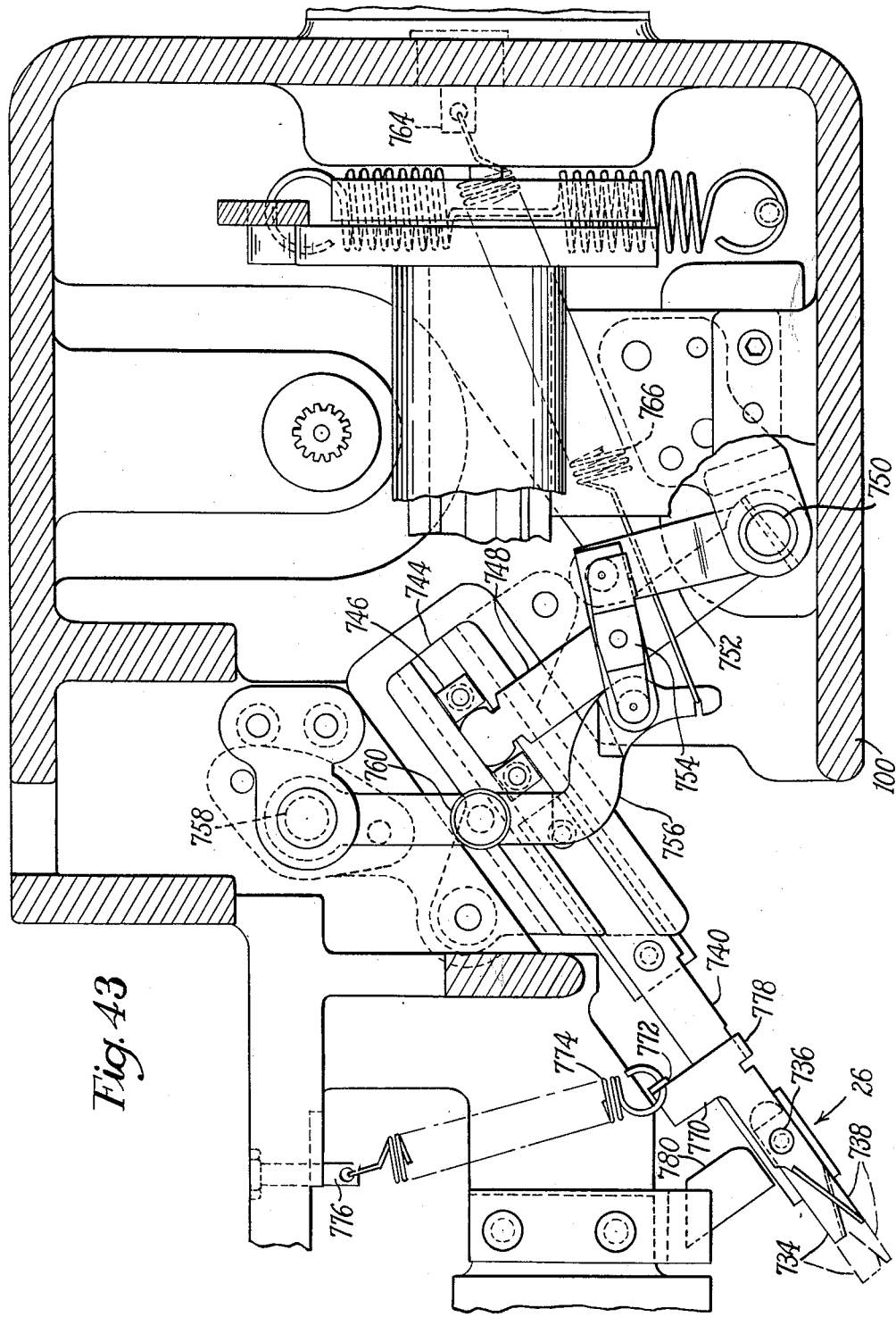

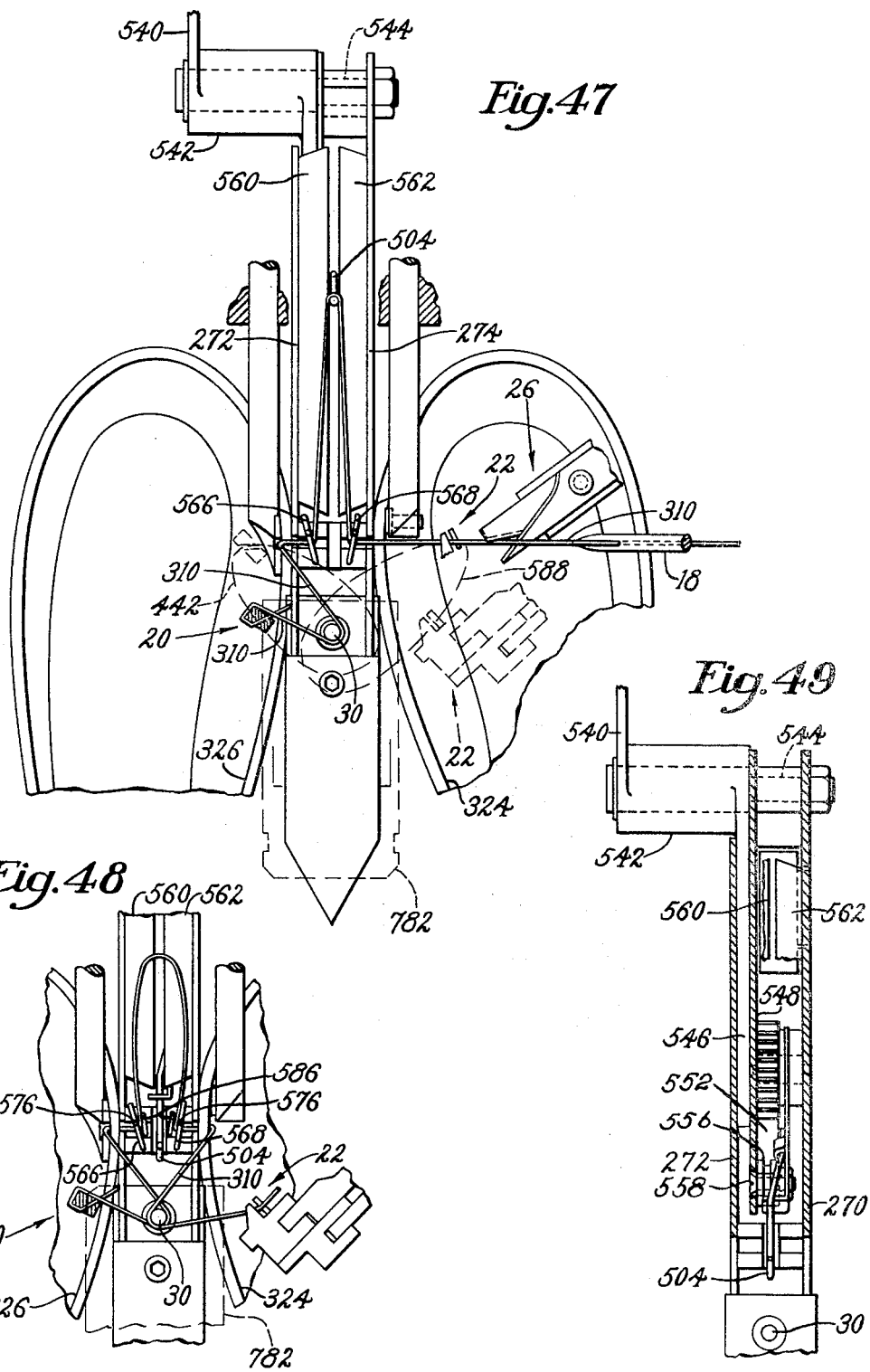

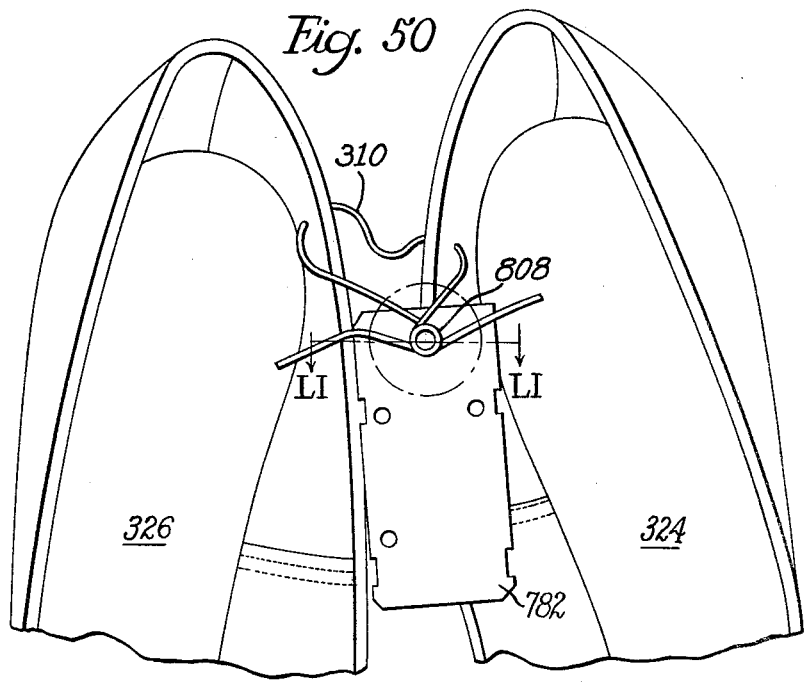
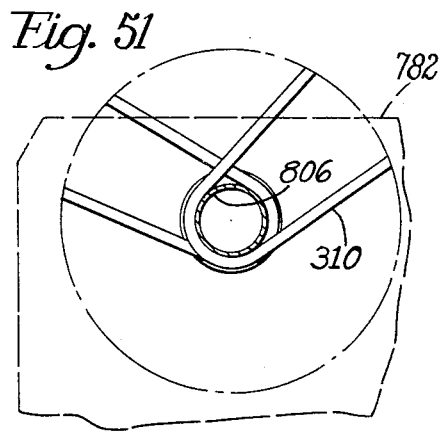
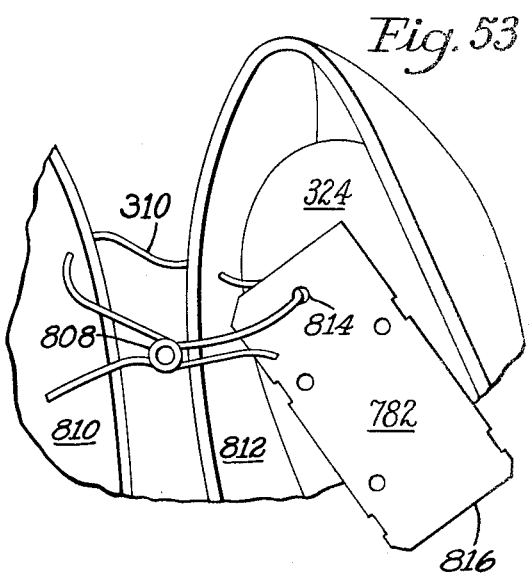
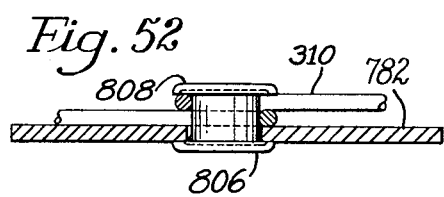

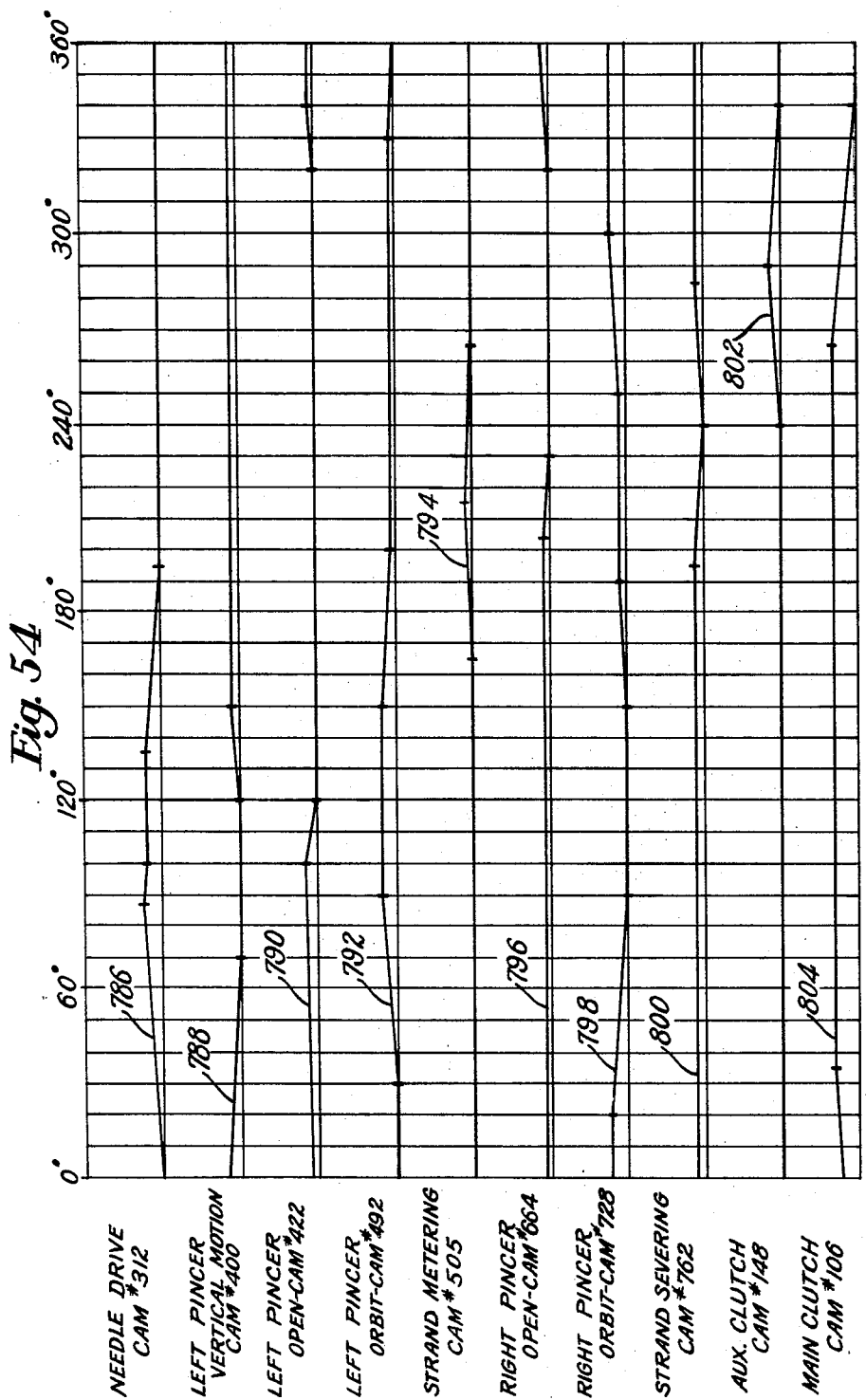

United States Patent Office 3,142,896
Patented Aug. 4, 1964

3,142,896
STRINGING MACHINES
Charles P. Cardani, Hamilton, Vincent P. Romeo, Danvers, George F. C. Burke, Beverly, and Waldo B. Hanson, Rowley, Mass., assignors to United Shoe Machinery Corporation, Boston, Mass., a corporation of New Jersey
Filed June 15, 1961, Ser. No. 117,219
22 Claims. (Cl. 29—241)

The present invention relates to improved apparatus for stringing articles generally but not exclusively for connecting pairs together or for securing to a single article a loop of string or other flexible strand carrying a tag bearing price or other information.

In merchandizing there is a multiplicity of articles which either are or could best be displayed for sale bearing a price tag connected to the article by means of a flexible strand or string. The present invention not only relates to the stringing of single articles but is also directed to the problems of connecting together the two articles of a pair such as shoes, gloves and similar merchandise. In one of its aspects, the present invention is more particularly directed to the problem of tagging merchandise in such a way that tampering with the tag will be made evident. It will be appreciated that the switching of price tags by customers, as by placing a tag bearing a low price upon a more expensive article is a source of frequent embarrassment and very considerable loss to merchants. Accordingly much effort has been expended and many devices have been proposed in order to foil such practices. Prior proposals, however, have not been entirely successful because of the greatly increased cost attending the application of tags and the relatively large expenditure for proposed security devices.

It is accordingly a primary object of the present invention to provide a machine for connecting a tag to an article by means of a flexible strand so as to provide a telltale relationship between the ends of the string, that is, so that any tampering in detaching the tag from the article with which it was originally associated will be readily noticeable.

It is a related object to provide between the ends of the strand a connection having a strength generally comparable to that of the strand itself.

It is a further object to provide a machine for accomplishing the primary object at the highest possible speed while employing a minimum of manual labor.

It is a still further object to obtain the tell-tale relationship between the ends of a flexible strand without utilizing relatively expensive special devices made for the purpose.

A more particular object is to provide a machine not only capable of connecting a tag to a single article but also suitable for connecting together the two articles of a pair with or without an accompanying tag.

Yet another object is to provide a machine to which articles are presented for tag attaching at a high operating rate thereby reducing unit cost.

A still more particular object is to provide for the interconnection of the two articles of a pair by means of a flexible strand leaving the articles in spaced relationship to facilitate trial by the customer. An even more specific and related object is to provide a machine readily adjustable to vary the spatial relationship of the interconnected articles of a pair to suit the type of merchandise and the requirements of the merchant.

The foregoing objects are achieved by a novel machine in which an important feature relates to the cooperative association of work clamping, flexible strand manipulating, and eyelet setting instrumentalities. The present machine includes, according to a second feature of the invention, a treadle operated clamping means for holding either a single article in stringing position or a pair of articles to be connected together by a flexible strand. According to this feature of the invention the clamp actuating connections are so constructed that the clamping pressure on the two articles of a pair is equalized in the event that different thicknesses are engaged by the clamping means.

The present machine includes, according to another feature of the invention, a curved eye pointed needle for carrying the leading end of the strand through article supported in tagging position. Cooperating with the needle for handling the strand is a pair of pincers and a strand severing means. The first pincer grips the leading end of the strand after it has been passed through either one or a pair of articles and as the needle is withdrawing this pincer forms a bight from the leading end portion of the strand about the pilot spindle of a generally conventional eyeleting machine. After the needle is completely withdrawn from the article or work piece the severing means is automatically actuated to cut that part of the strand which has been threaded through the article from the supply. Before the strand is severed it is gripped by the second pincer between the eye of the needle and the article and a second bight is formed around the spindle of the eyeleting machine. Thereafter the ram of the eyeleting machine is automatically triggered to clinch an eyelet securing the two ends of the strand in tell-tale relationship. The clinching of the eyelet may be accomplished so that the two ends of the strand are secured to a tag or in the alternative the strand may be passed through a perforation in the tag and the ends only of the strand secured together in tell-tale relationship by means of the eyelet.

Another feature of the invention relates to an adjustable strand measuring device particularly valuable when interconnecting the two members of a pair such as shoes by means of a flexible strand. The measuring device engages the strand between the two articles and as the needle is being withdrawn but before the strand is severed, is actuated to measure a predetermined length of strand which is reaved through the eye of the needle. After the operation is completed the measured length of strand provides a desirable spaced relationship between the interconnected articles. Whenever the nature of the merchandising operation calls for trial of the article by the customer before purchase, the spacing of the two articles of the pair can be increased to facilitate trial and on the other hand by adjusting the measuring means so as to minimize the separation between the articles of the pair, trial by the customer may be effectively limited.

Further features and advantages of the present invention reside in the selection, arrangement and timing of various submechanisms to accomplish the stringing of a variety of merchandise with economy both of materials and of labor.

The foregoing general and specific features as well as numerous other contributing features will be more fully appreciated from a detailed description of an illustrative embodiment of the invention taken in connection with the accompanying drawings in which:

FIG. 4 is a detail view in right side elevation showing a main clutch and a cam actuated control lever for the main clutch;

FIG. 5 is a view in cross section taken along the line

Figure 3:
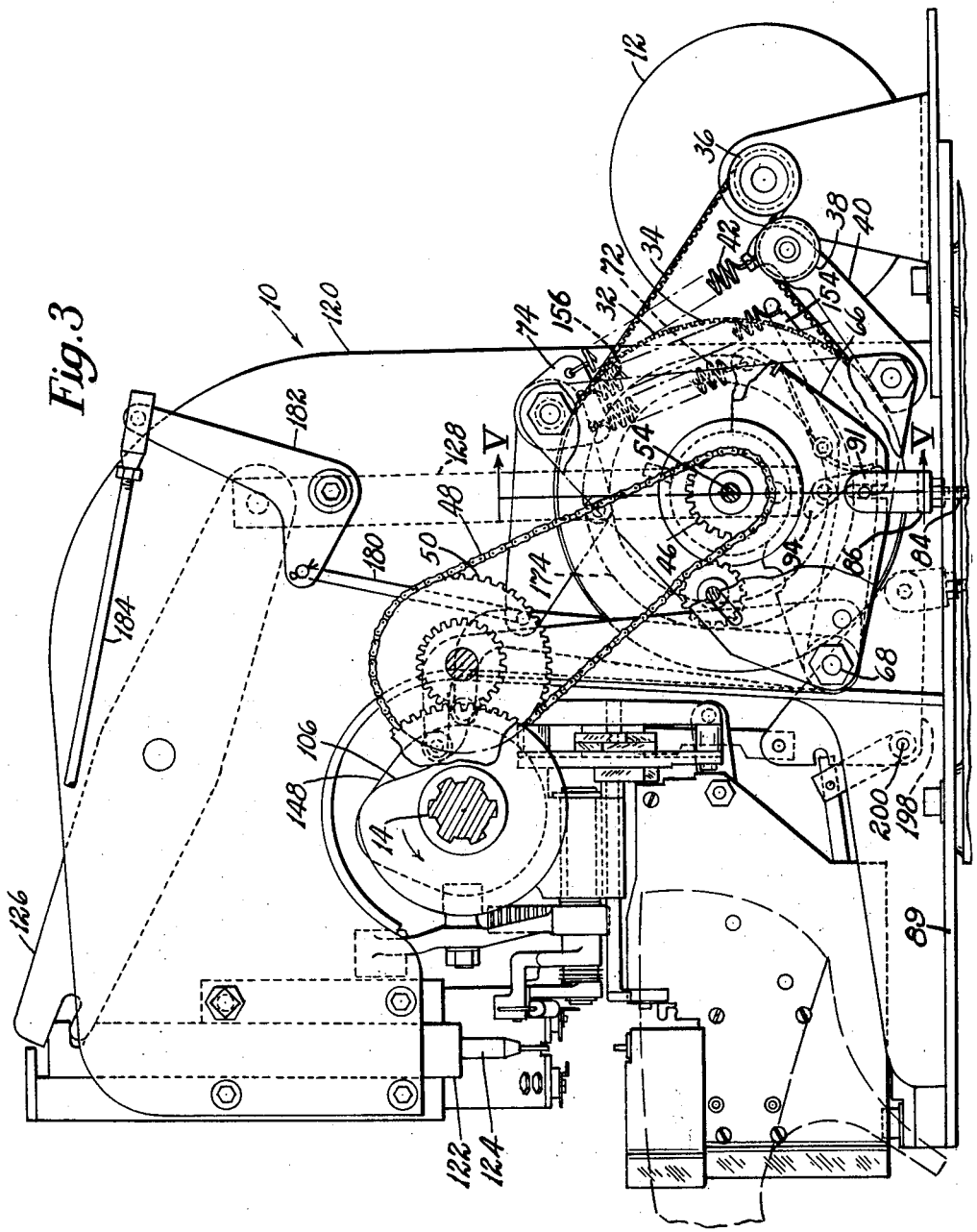
FIG. 3 is a view of the machine of FIGS. 1 and 2 taken in right side elevation and showing details of power transmission elements incorporated in the machine.
Figure 12:
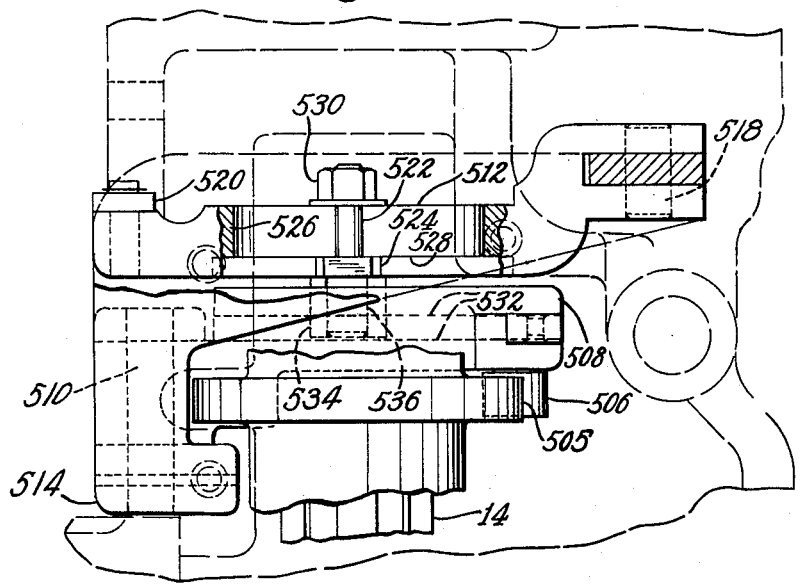
Figure 13:
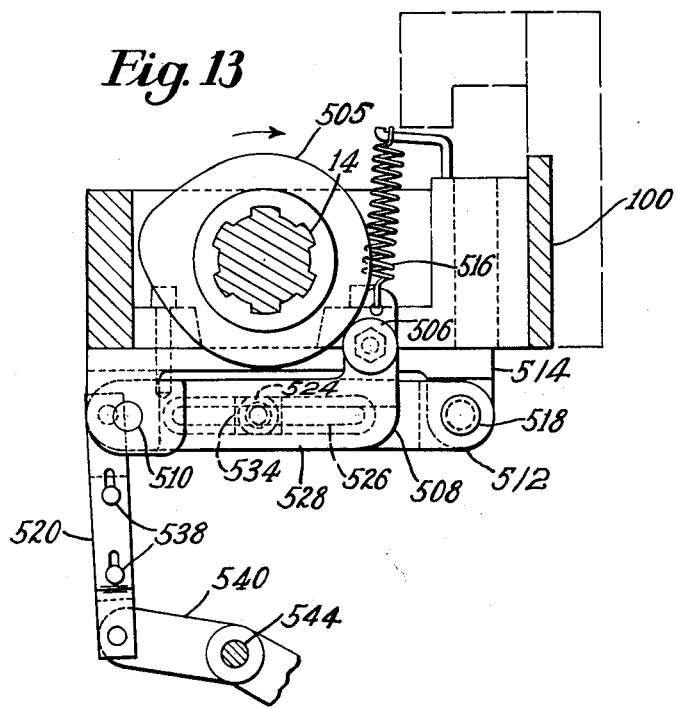
Figure 18:
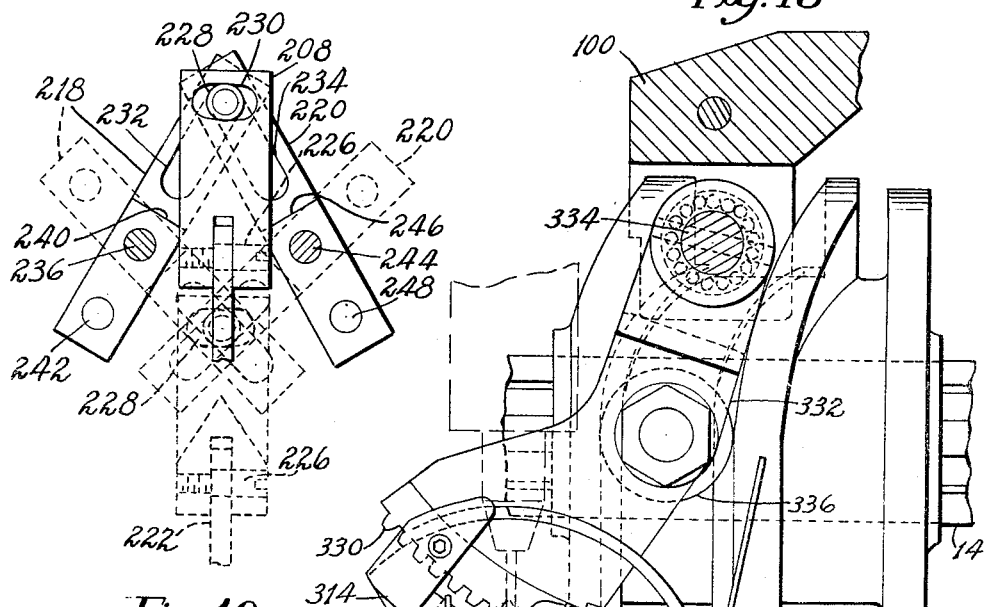
Figure 19:
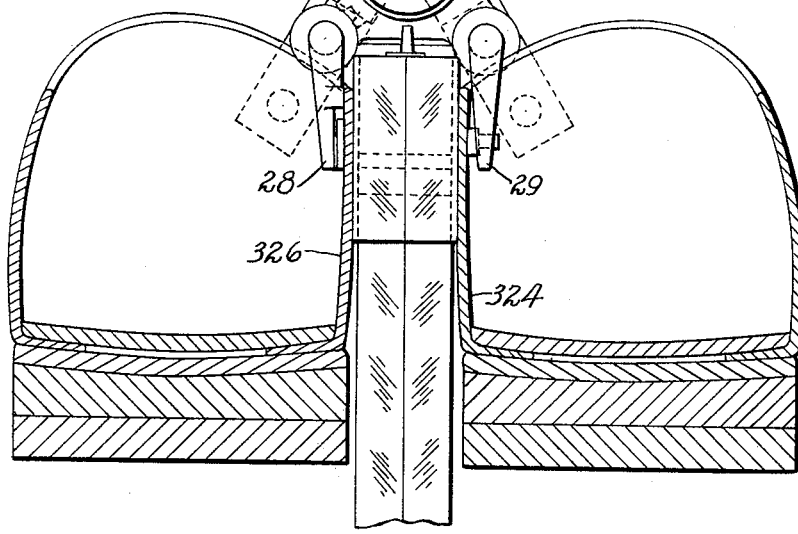
Figure 20:
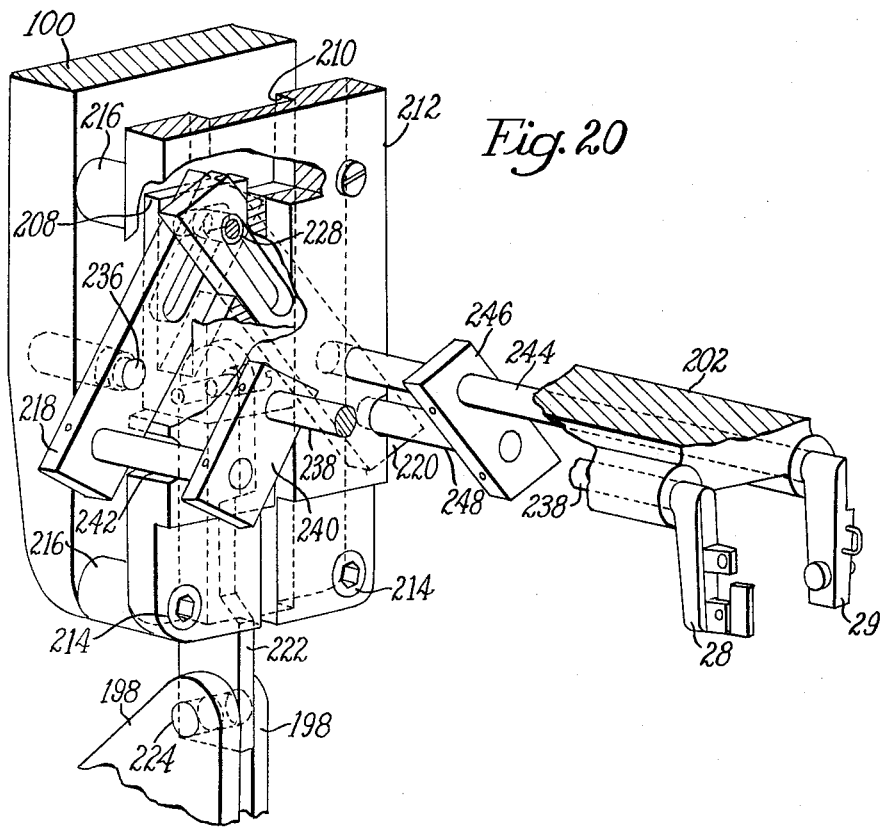
Figure 21:
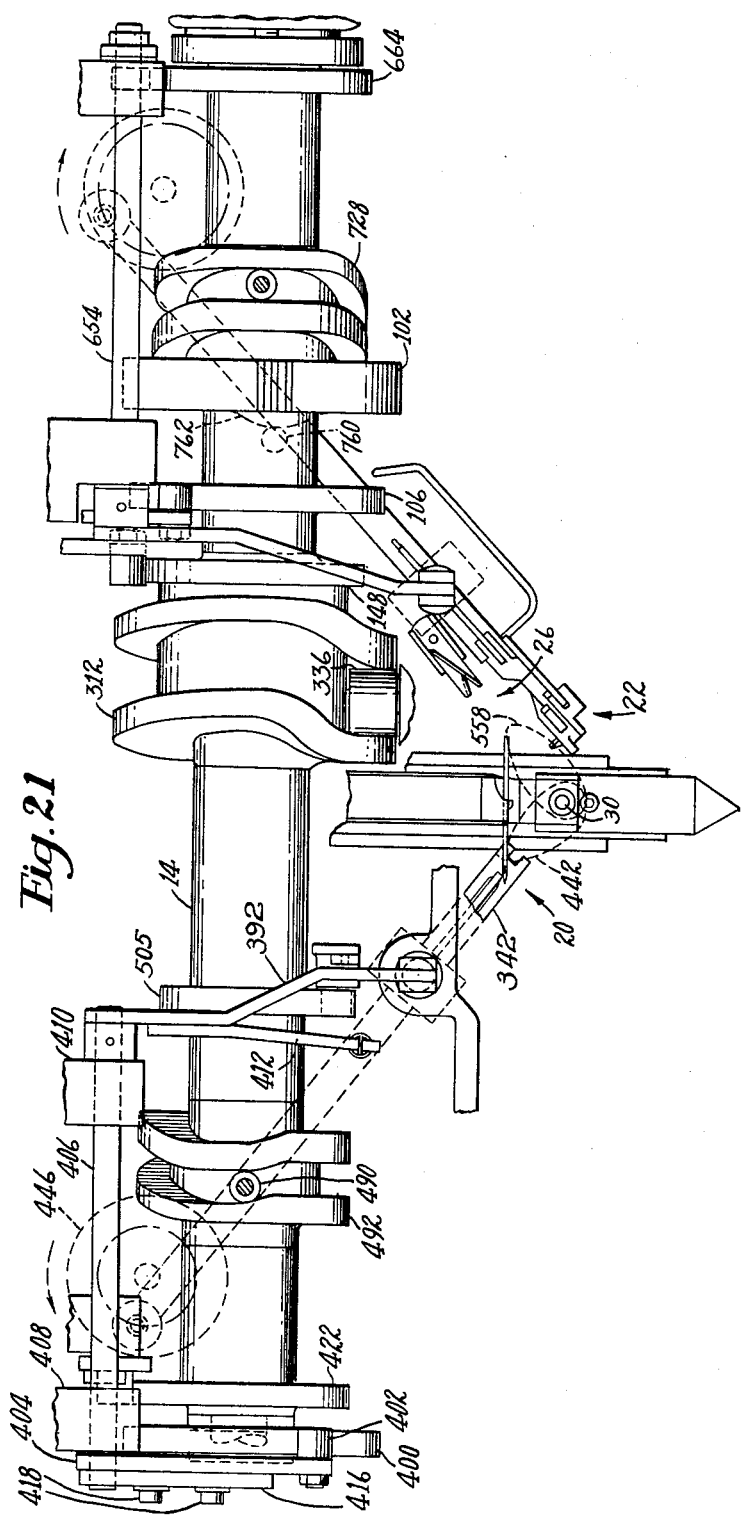
Figure 22:
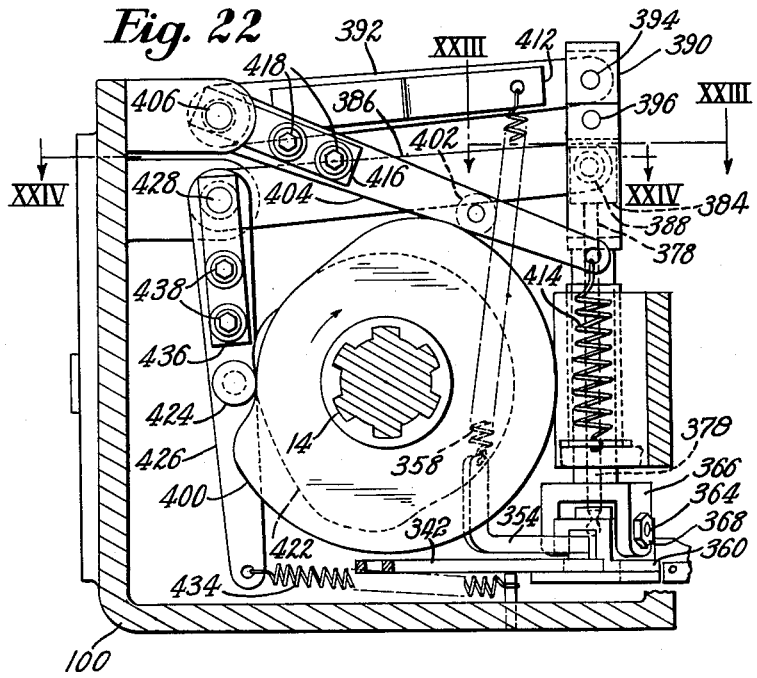
Figure 23:
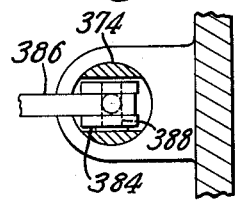
Figure 24:
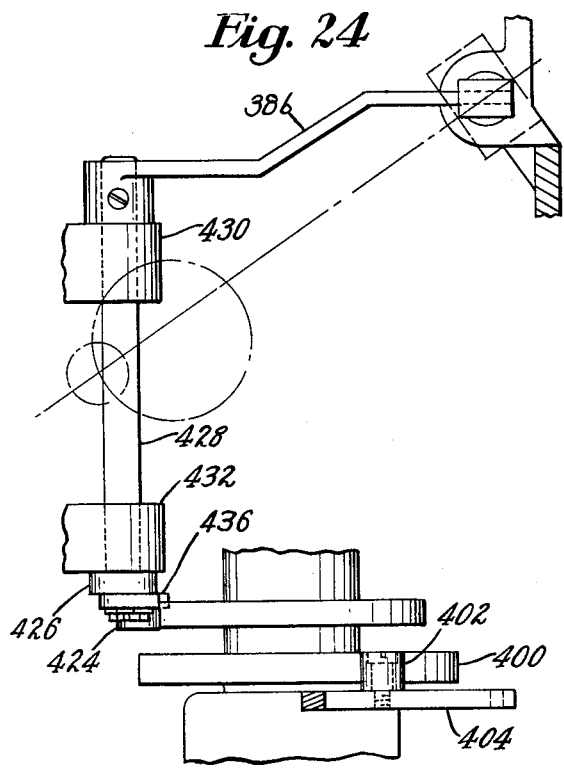
Figure 25:
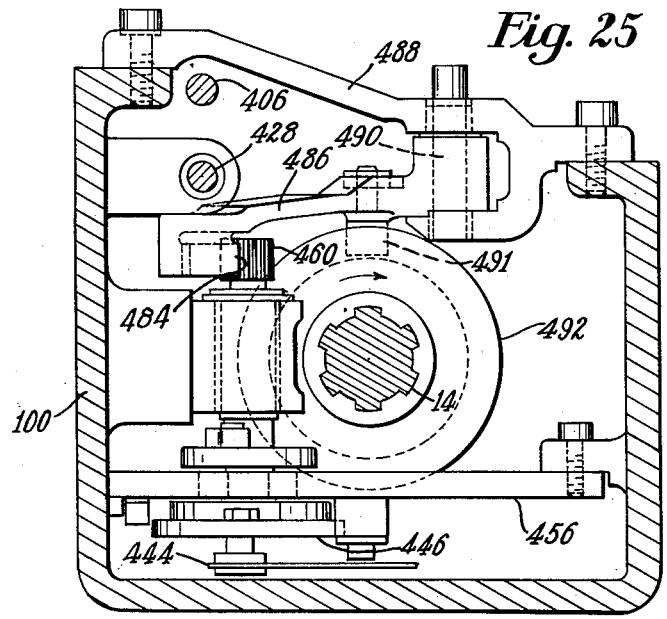
Figure 26:
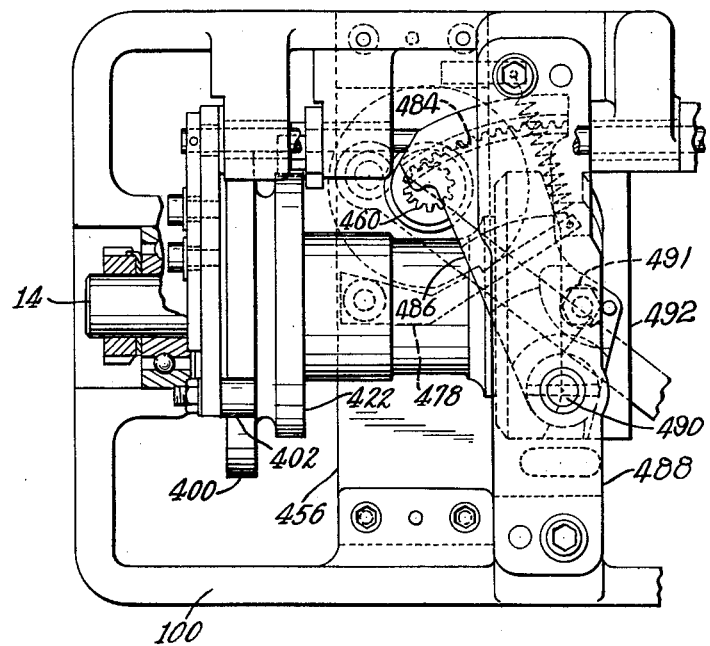
Figure 34:
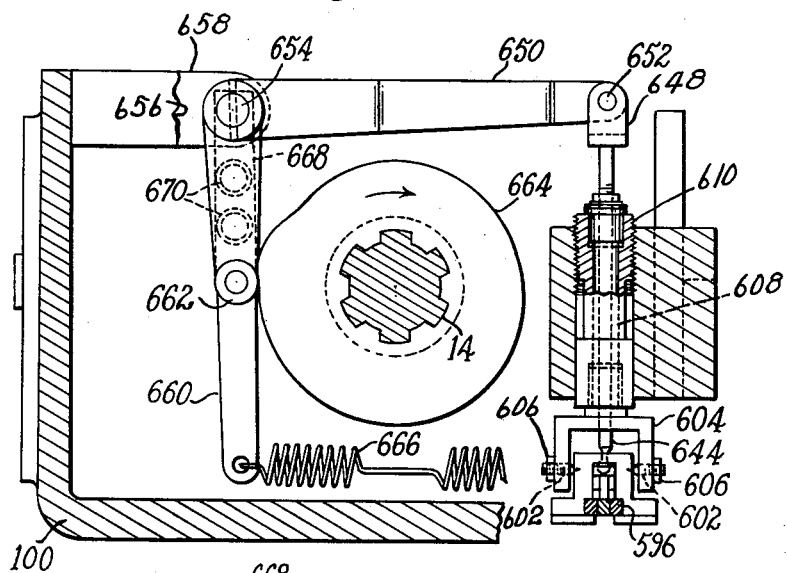
Figure 35:
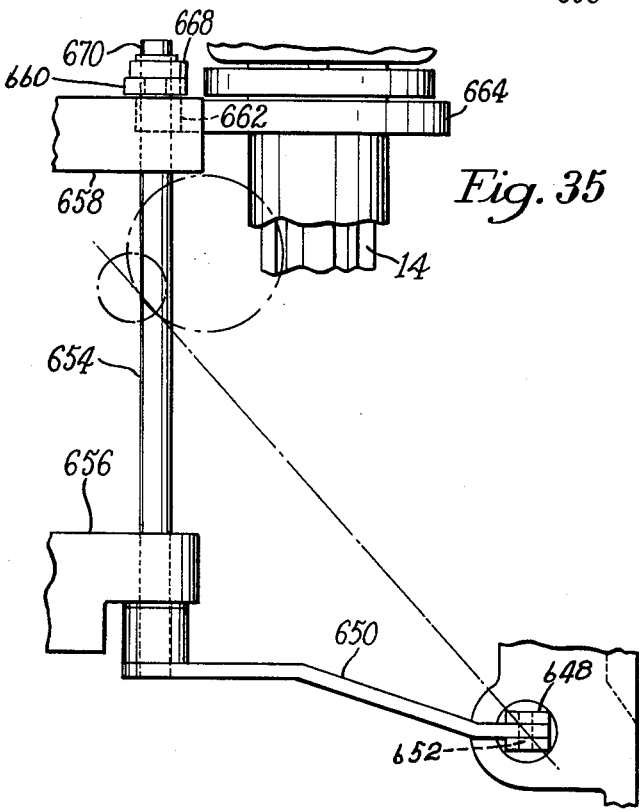
Figure 36:
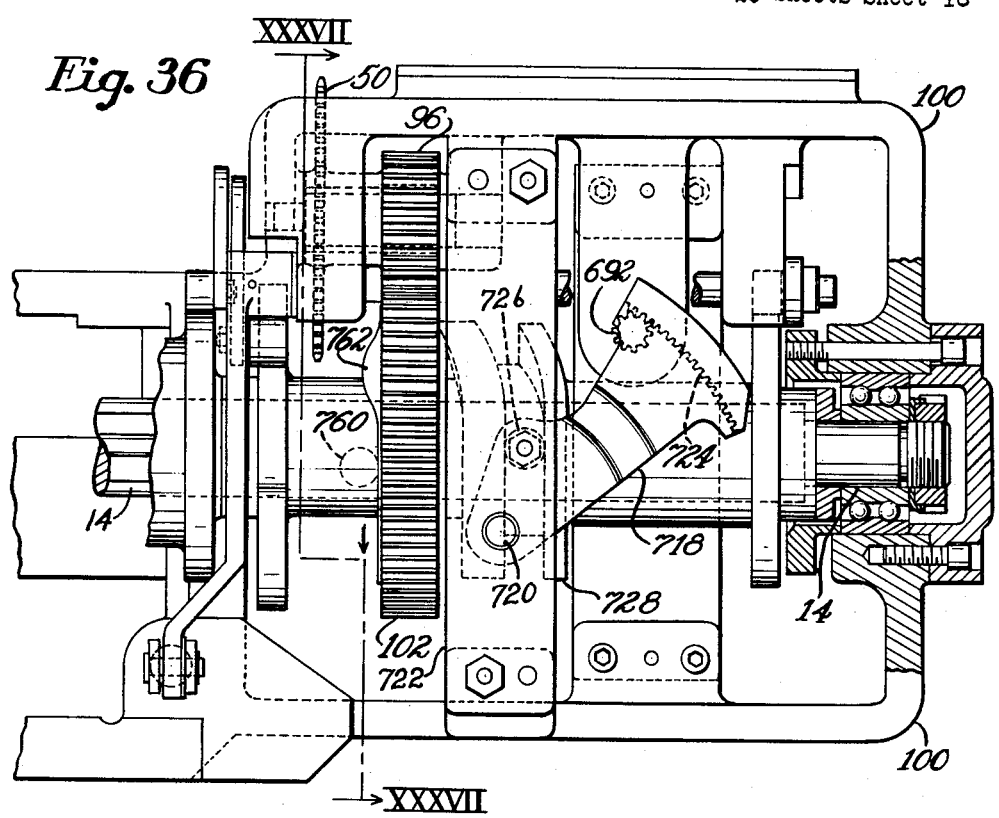
Figure 37:
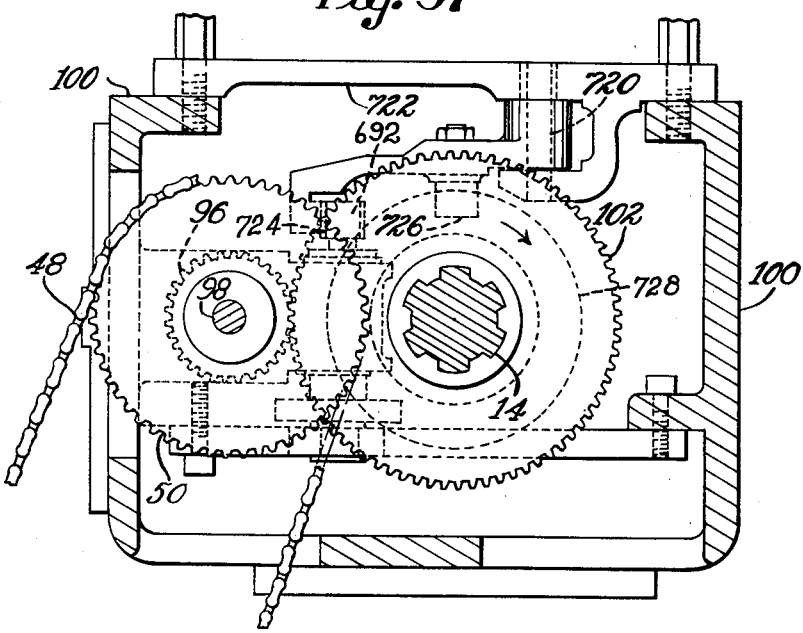
Figure 38:
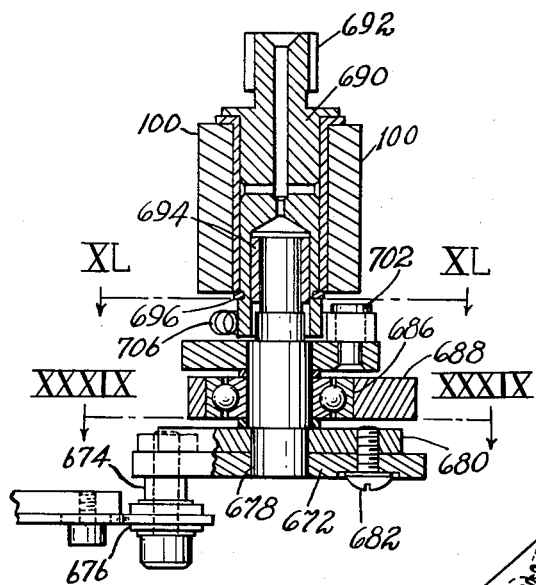
Figure 39:
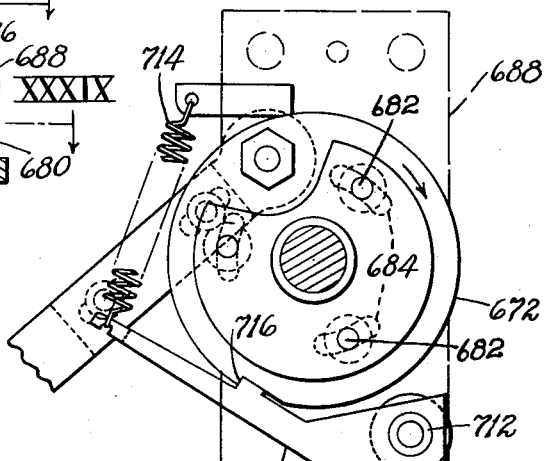
Figure 40:
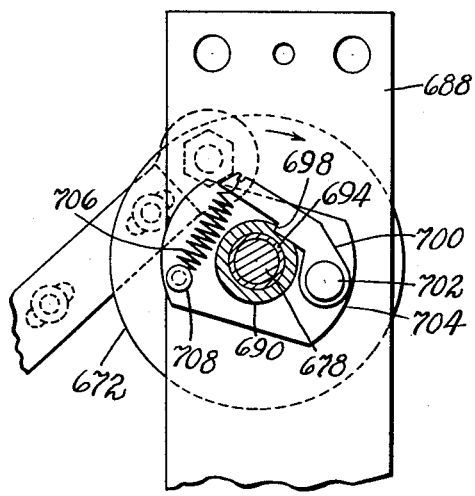
Figure 44:
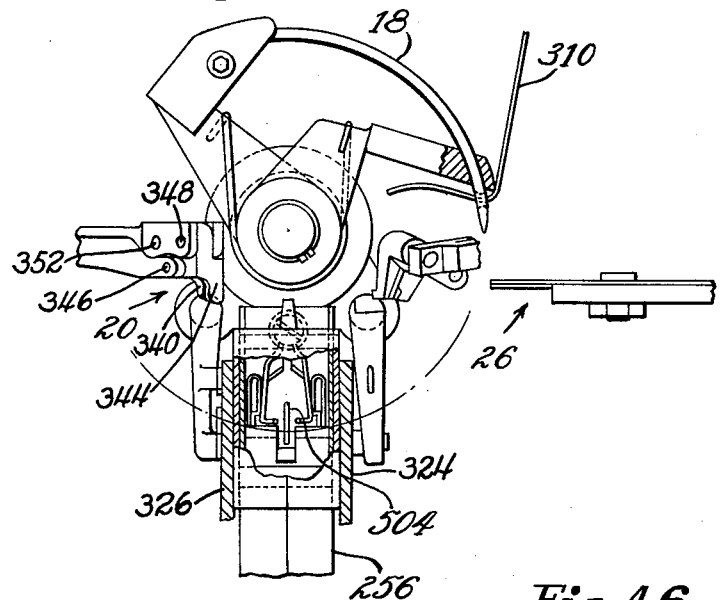
Figure 45:
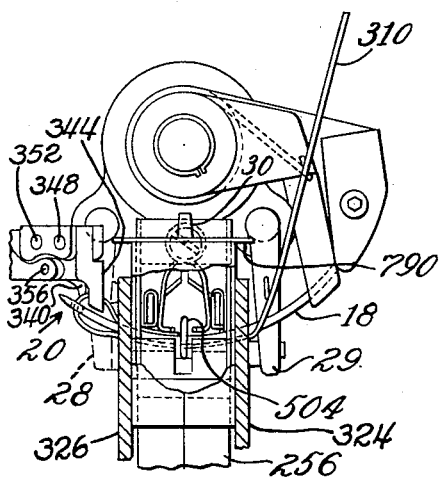
Figure 46:
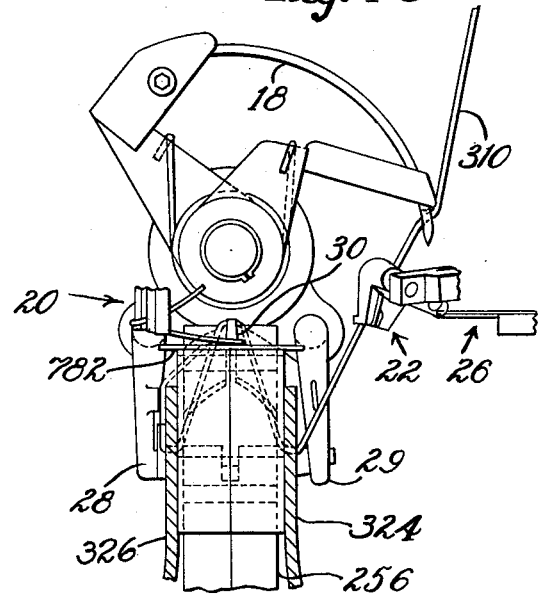

V—V of FIG. 3 showing a pair of clutches including the main clutch for driving a main cam shaft of the machine and an auxiliary clutch for performing an eyeleting operation;

FIG. 6 is a detail schematic view in cross section showing more particularly cam plates controlling the engagement and disengagement of a driving pin in each clutch;

FIG. 7 is a detail view in right side elevation on a larger scale than FIG. 3, showing a second cam actuated power control lever for triggering the eyeleting operation;

FIGS. 8 and 9 are schematic views in cross section and right side elevation respectively, depicting the disengagement of the main clutch driving pin;

FIG. 10 is a detail view in left side elevation showing the construction and actuating means for a post upon which the eyeleting operation is carried out and also cam actuated connections for a strand measuring device;

FIG. 11 is a detail view in cross section taken along the line XI—XI of FIG. 10 and further illustrating the eyeleting post actuating means;

FIG. 12 is a fragmentary detail plan view of the actuating connections for the strand measuring device;

FIG. 13 is a detail view partly in cross section showing an arrangement for varying measurement of strand;

FIG. 14 is a fragmentary view in right side elevation and on an enlarged scale, showing further details of the eyeleting post and the strand measuring device;

FIG. 15 is a view in cross section taken along the line XV—XV of FIG. 14, and illustrating the construction of the eyeleting post;

FIG. 16 is a detail view in front elevation taken along the line XVI—XVI of FIG. 14 showing rails upon which the strand is measured;

FIG. 17 is a view in left side elevation and partly in section showing details of a needle drive incorporated in the machine;

FIG. 18 is a view in front elevation illustrating the needle drive and article clamping means;

FIG. 19 is a fragmentary detail view illustrating connections to the article clamping means;

FIG. 20 is a schematic view in perspective showing the clamping means together with actuating connections;

FIG. 21 is a plan view of a main cam shaft of the machine also illustrating the relative position of submechanisms included in the machine;

FIG. 22 is a view in left side elevation partly in cross section illustrating the suspension and actuating connections for a left pincer included in the machine;

FIG. 23 is a view in cross section taken along the line XXIII—XXIII of FIG. 22;

FIG. 24 is a detail plan view of the connections for opening the left pincer taken along the line XXIV—XXIV of FIG. 22;

FIG. 25 is a view in left side elevation showing mechanism for imparting an orbital movement to the left pincer;

FIG. 26 is a detail plan view of the mechanism also illustrated in FIG. 25;

FIG. 27 is a schematic view in cross section shown with parts relatively rotated about an axis and illustrating a unidirectional drive for providing the orbital movement to the left pincer;

FIG. 28 is a view taken in the direction XXVIII—XXVIII of FIG. 27;

FIG. 29 is a detail view in cross section taken along the line XXIX—XXIX of FIG. 28 and illustrating a locking pawl for the left pincer actuating connections;

FIG. 30 is a view in cross section taken along the line XXX—XXX of FIG. 27 and illustrating a driven pawl for the left pincer;

FIG. 31 is a view in vertical cross section showing details of connections for the opening and closing and lowering and raising of the left pincer;

FIG. 32 is a fragmentary detail plan view of the left pincer and a slide upon which it is mounted;

FIG. 33 is a detail view partially in cross section taken along the line XXXIII—XXXIII of FIG. 31 and showing a pivot block mounting in which the left pincer slide is supported;

FIG. 34 is a view in left side elevation partly in cross section showing mechanism for opening and closing a right pincer incorporated in the machine;

FIG. 35 is a plan view of the mechanism depicted in FIG. 34;

FIG. 36 is a plan view illustrating mechanism for imparting an orbital movement to the right pincer;

FIG. 37 is a view in cross section taken along the line XXXVII—XXXVII in FIG. 36 and showing the mechanism for imparting orbital movement to the right pincer, and details of the driving connections for the main cam shaft of the present machine;

FIG. 38 is a schematic view in vertical cross section and with parts relatively rotated about an axis, depicting an arrangement of pawls for providing an orbital movement to the right pincer;

FIG. 39 is a detail view taken along the line XXXIX—XXXIX of FIG. 38, illustrating the construction and mounting of a locking pawl;

FIG. 40 is a detail view partially in cross section taken along the line XL—XL of FIG. 38 and illustrating the construction of a driven pawl for the right pincer;

FIG. 41 is a view in vertical section showing operating connections and supporting means for a slide upon which the right pincer is mounted;

FIG. 42 is a detail plan view of the right pincer and its associated slide;

FIG. 43 is a fragmentary plan view depicting a strand severing device and its operating connections;

FIG. 44 is a detail schematic view depicting work contacting instrumentalities of the machine at the start of the operating cycle;

FIG. 45 is a view similar to FIG. 44 but showing the instrumentalities at a time when a strand has been carried through the work pieces and has been engaged by the left pincer;

FIG. 46 is a view similar to FIG. 44 and FIG. 45 but taken late in the operating cycle and showing the right pincer about to engage the strand;

FIG. 47 is a schematic detail plan view of the work contacting instrumentalities shown at a later time in the operating cycle when the string is about to be severed;

FIG. 48 is a view similar to FIG. 47 but restricted in area and depicting the end portions of the string just prior to being securely fastened together in tell-tale relationship;

FIG. 49 is a detail plan view partially in cross section depicting the construction of the string measuring means incorporated in the machine;

FIG. 50 is a view in perspective of a pair of shoes strung together with a tag according to a preferred mode of operation of the present machine, the ends of the string being secured to the tag in tell-tale relationship;

FIG. 51 is a view on a large scale of an area of the tag showing the arrangement of string beneath the head of the eyelet;

FIG. 52 is a view in cross section taken along the line LII—LII of FIG. 50, showing the engagement of the string by the head of the eyelet;

FIG. 53 is a view in perspective similar to FIG. 50 showing an alternative mode of stringing together shoes, the tag being free to move along a section of the string; and FIG. 54 is a timing chart of the machine.

*General Description*

A machine according to the present invention is best illustrated in FIGS. 1 to 3 and 21 and includes, in addition to an eyeleting machine, indicated generally at 10, a motor 12 which drives a shaft 14 upon which is mounted a series of cams for actuating various devices to perform a stringing or tagging operation. In addition to actuating various devices which will be described, the shaft 14 also carries timing cams for controlling the starting and stopping of the machine after a treadle 16 has been depressed.

The devices actuated by cams on the shaft 14 include a curved eye-pointed needle 18, a first or left pincer and a second or right pincer indicated generally at 20 and 22 respectively. Also actuated by a cam on the shaft 14 is a strand measuring finger or arm 24 shown in FIG. 10 and a strand severing device indicated generally at 26 in FIG. 21.

Figure 1:
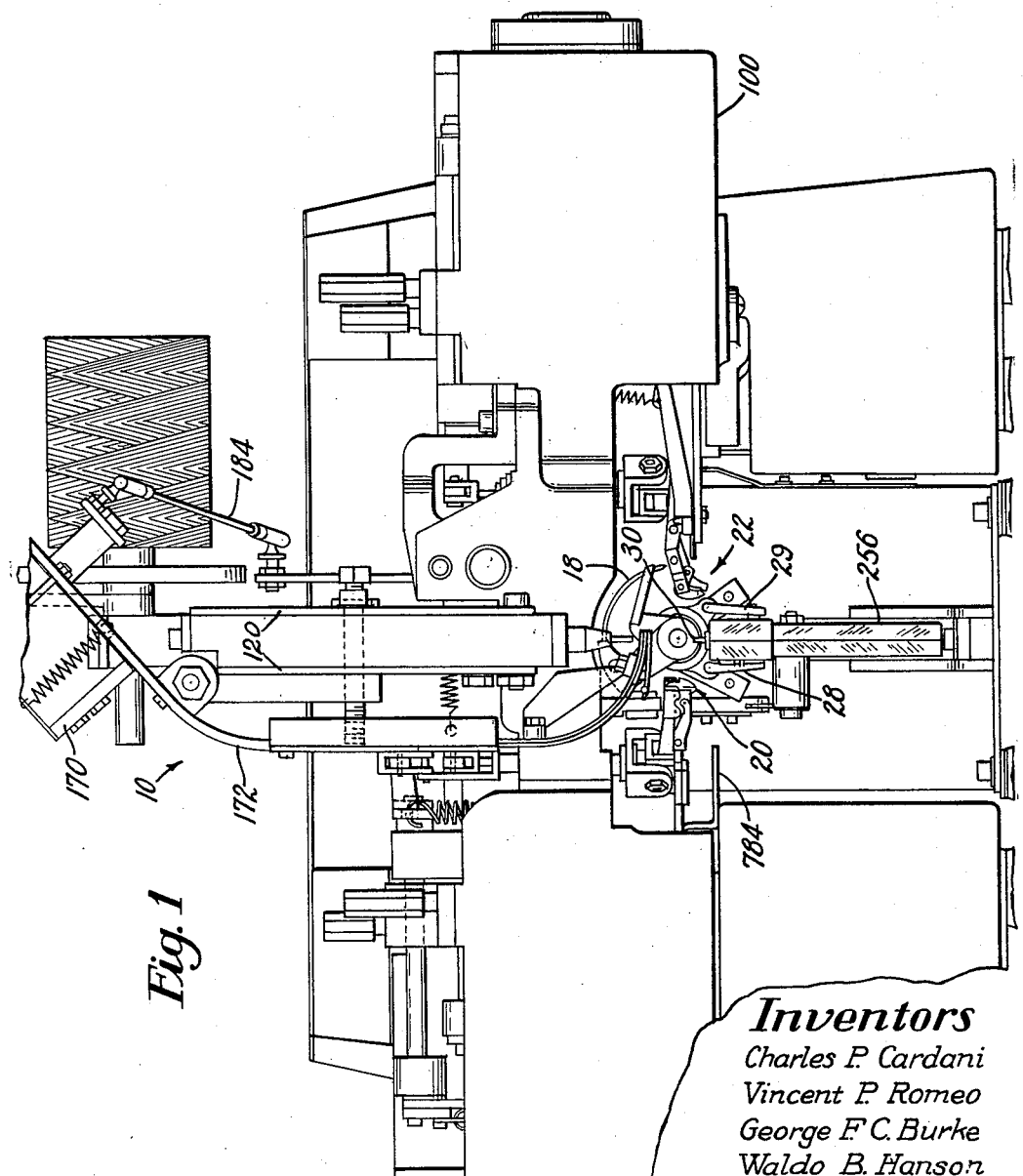
FIG. 1 is a general view in front elevation of a machine according to the invention.

In general terms the operation of the present machine consists of imparting to the needle 18 a clockwise motion as seen in FIG. 1 to cause it to penetrate a single article or a pair of articles held in stringing position by one or both of a pair of clamps 28 and 29 in FIG. 20. The needle 18 in operating on a pair of articles or work pieces penetrates the articles retained by the clamps 28, 29 carrying the leading end portion of a flexible strand or string and is then retracted a short distance to form a bulge from the leading end portion of the strand. The pincer 20, as the needle is forming the bulge, descends to grip the bulge so that the needle may thereafter be withdrawn to the position shown in FIG. 1. After the needle has withdrawn from the work pieces the strand measuring finger 24 is actuated to reave through the eye of the needle, a predetermined quantity of the strand to provide the desired separation between two tied-together articles. Following the measurement of strand by the finger 24 the right pincer 22 grips the strand between the eye of the needle and the article from which the needle last emerged. Once the strand has been firmly gripped by the pincer 22 the severing device 26 is actuated to cut the strand between the needle and the pincer 22 leaving a length of strand extending through the eye of the needle to form a loop in stringing the next article or pair of articles. According to a timing sequence which will be explained in greater detail later, the pincer 20 first and the pincer 22 thereafter are actuated in an orbit about an eyeleting spindle 30 to form opposed bights which are thereafter securely connected together in telltale relationship by an eyelet clinched on the spindle 30.

Drive and Control Devices

Interposed between the motor 12 and the shaft 14 is an arrangement of driving and control connections best seen in FIGS. 3 to 7 inclusive and comprising a pulley or bull wheel 32 driven from the motor by a cogged or "timing" belt 34 also traveling over a driving pulley 36 at the motor. To insure adequate wrap of the pulley 36 and also to maintain tension on the belt 34 an idler pulley 38 mounted on a pivoted arm 40 is urged into engagement with the outside of the belt by a spring 42.

For coupling the pulley 32 to the shaft 14 there is provided a clutch including a body 44 to the right or outer side of the pulley 32 as seen in FIG. 5. Integral with the clutch body 44 is a sprocket 46 over which passes a roller chain 48 which drives a larger sprocket 50. The pulley 32, the body 44 and a second clutch body 52 which carries mechanism for actuating the eyeleting machine 10 are rotatably supported upon a short intermediate shaft 54 fixedly supported between an outer plate 56 and an inner plate 58. In order to reduce friction, oilless bearings are provided for the clutch bodies 44 and 52 and for the pulley 32.

The body 44 is coupled to the pulley 32 by a bolt 60 slidably mounted in the clutch body and urged by a spring 62 toward the outer face of the pulley 32 in which are formed a pair of arcuate driving slots 64 (FIGS. 5 and 6). When the machine is not in actual operation, that is, when the shaft 14 is not rotating, the bolt 60 is held out of engagement with the slots 64 by a cam plate 66 pivoted upon a stud 68 (FIGS. 3 and 4) extending between the plates 56 and 58. As seen in FIGS. 4 and 5 the cam plate is urged into engagement with an annular groove 70 in the clutch body by a tension spring 72 connected between the distal end of the plate and an anchor 74 loosely supported upon another stud 76 extending between the plates 56 and 58 as in the case of the stud 68. The groove 70 in the body 44 is of sufficient depth that the edge portion of the plate 66 nearest the shaft 54 engages the bolt 60. The edge portion of the plate 66 provides a cam surface 78 which engages a shoulder 80 on the bolt 60, as shown more particularly in FIGS. 8 and 9, to withdraw the bolt as the clutch body 44 rotates thereby decoupling the body 44 from the pulley 32.

To release the bolt 60 to start the machine the cam plate is rocked in a clockwise direction, as seen in FIG. 4, by connections to the treadle 16 which is provided with a vertical link rod 84 connected to the plate 66. At its upper end the rod 84 supports a slotted header 86 through which passes a pin 88. A plate 89 which forms the base of the machine and through which the rod passes provides a stop to limit the downward movement of the rod. While the machine is idle the plate 66 which is slotted at 90 is in the position depicted in FIG. 4 and the pin 88 is engaged by a hook 91 pivotally supported at 92 on the plate. The hook 91 is formed above the pivot 92 with an angularly extending tail section 94 the purpose of which will be explained. When the treadle 16 is moved to depress the rod 84 the coupling provided by the hook 91 causes the plate 66 to be rocked in a clockwise direction releasing the bolt 60 to be pressed into engagement with one of the slots 64.

The accompanying rotation of the body 44 with the bull wheel 32 is transmitted to the sprocket 50 by the chain 48. Formed integral with the sprocket 50 is a driving pinion 96 best shown in FIGS. 36 and 37, rotatably mounted with the sprocket 50 upon a short countershaft 98 fixedly supported in a housing or subframe 100. The pinion 96 is in toothed engagement with a gear 102 coupled by means of internal splines to the main shaft 14. The tooth ratios of sprockets 46 and 50 and of the pinion 96 and the gear 102 are calculated to provide a five to one speed reduction from the bull wheel 32 to the shaft 14, that is, the shaft 14 revolves through one revolution during five revolutions of the bull wheel 32.

A dog 104 (FIGS. 4 and 5) is pressed into the clutch body for engaging the tail 94 of the hook 91 near the end of each operating cycle of the machine in order to decouple the rod 84 from the plate 66. Once the bolt 60 has been released to engage one of the driving slots 64 in the pulley 32 the position of the plate 66 which withdraws and locks out the bolt 60 is controlled by a cam 106 which, being mounted on the shaft 14, completes a single revolution during each operating cycle of the machine. Secured to the plate 66 is an L-shaped arm 108 extending vertically and forwardly from the pivot 68 and having at its upper end a follower roll 110 normally maintained in contact with the periphery of the cam 106 by the spring 72. When, by treadle action, the rod 84 is depressed, however, the plate 66 is rocked in a clockwise direction as seen in FIGS. 3 and 4 and the follower roll 110 moves temporarily out of contact with the periphery of the cam 106. By the time that the dog 104 reaches the position of the tail 94 the shaft 14 has revolved sufficiently that an increased dimension of the cam engages the roll 110 moving the plate 66 farther from the bolt 60 and the tail 94 out of the path of the dog 104. The cam 106 is formed with a contour which maintains the follower roll 110 away from the axis of the shaft 14 and consequently prevents the re-engagement of the cam surface 78 of the plate 66 with the bolt 60. When the single revolution of the shaft 14 is nearly completed a portion of the cam 106 formed with a reduced dimension permits the roll 110 to approach the axis of the shaft 14 and the plate 66 to engage the shoulder 80 on the bolt 60 to withdraw the bolt as shown in FIGS. 8 and 9. At the same time the tail 94 is returned to the position shown in FIG. 4 in which it is engaged by the dog 104 to decouple the rod 84 from the plate 66 to prevent a repetition of the machine cycle. When the rod 84 is thus decoupled, the pin 88 remains in the slot 90 even though the treadle 16 is still depressed and when the treadle is thereafter released, the pin, as the rod 84 is urged upwardly by a spring 111 (FIG. 2), is re-engaged by the hook 91 and the machine is thus ready to begin the next operating cycle when the treadle is again depressed. The arm 108 is pivoted upon the stud 68 alongside the plate 66 and is adjustably secured to it by screw and slot connections 114, 112, to compensate for varying distances between the axis of the shaft 14 and the positions of the plates 56 and 58 which determine the axes of the shaft 54 and the stud 68.

*Eyeleting Machine and Drive*

Figure 2:
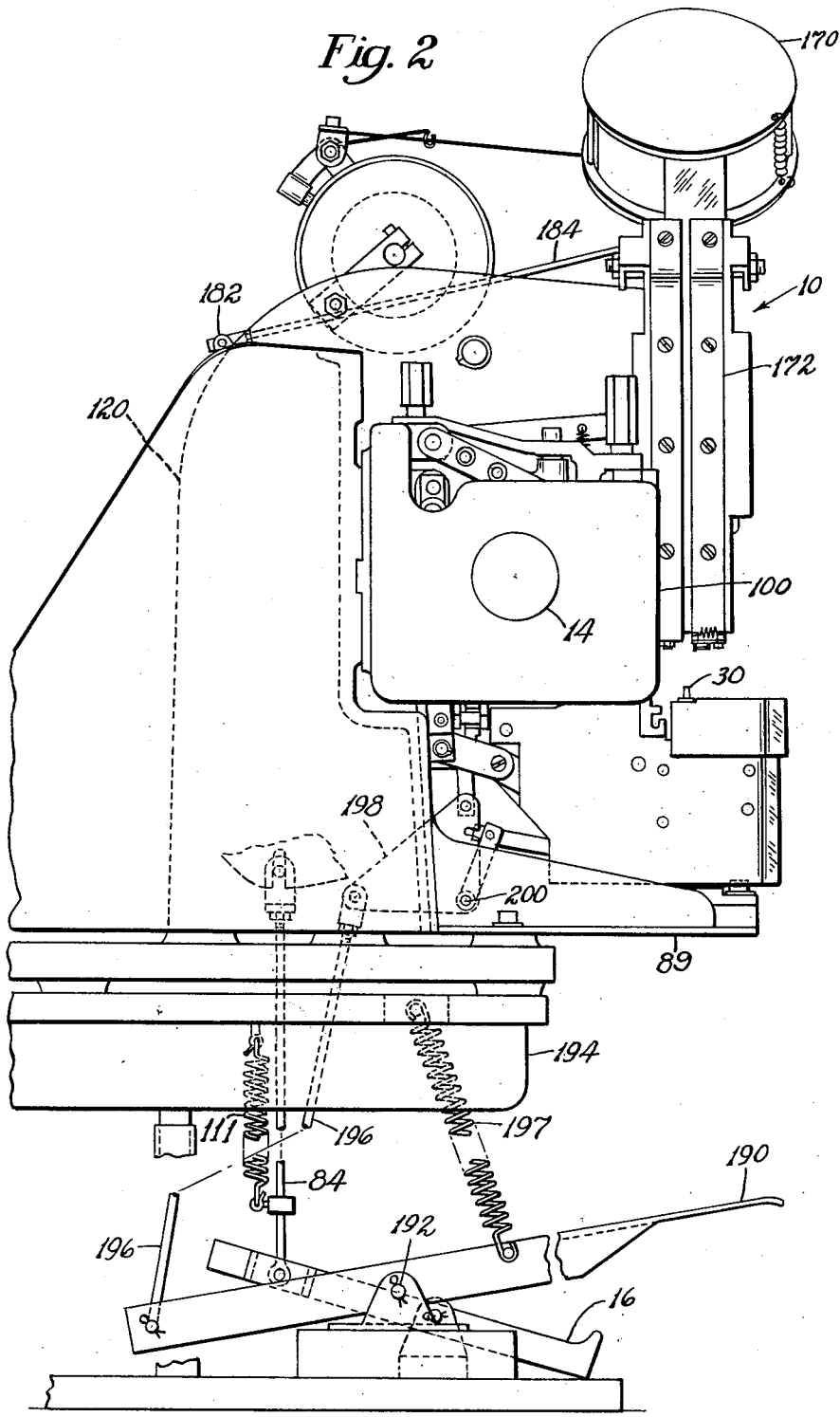
FIG. 2 is a view in left side elevation of the machine depicted in FIG. 1.

The eyeleting machine indicated generally at 10 in FIGS. 1, 2 and 3, is of a conventional design including a welded steel frame 120 in which is slidably mounted a vertical ram 122 carrying an eyeleting tool 124 at its lower end. The frame 120 includes as one of its integral parts the plate 89 and secured to the frame is the subframe 100 in which are mounted the shaft 14 and many of the devices operated therefrom. Connected to the ram 122 is a generally horizontal lever 126 pivoted on the frame 120 and having a pivotal connection at its rearward end with a generally vertical link 128. In order to perform an eyeleting operation at the proper time in the machine cycle, the link 128 is reciprocated by the action of an auxiliary clutch comprising the body 52 located on the inner side of the pulley 32 as shown in FIGS. 3, 5, 6 and 7. The body 52 is journaled in a large bearing 130 fixed in the plate 58 and is also free to rotate about the fixed shaft 54. The arrangement for coupling the body 52 for one revolution with the pulley 32 is generally similar to that provided in the main clutch including the body 44. The auxiliary clutch body 52 is formed with a peripheral groove 132 into which extends a cam plate 134 similar in form and function to the plate 66. Slidably mounted in the body 52 is a driving pin 136 pressed toward the pulley 32 by a spring 138. The pin 136 has a midportion of reduced diameter to provide a shoulder 140 engageable by a cam surface 142 formed in the margin of the plate 134 nearest the axis of the shaft 54. When the plate 134, also pivoted on the stud 68, is moved in a clockwise direction, as seen in FIG. 7, it releases the pin 136 to enter one of two arcuate slots 144 formed in the inner side of the pulley 32 for driving the body 52 until the pin 136 is withdrawn. As will be explained, the body 52 is driven through a single revolution and this rotation is translated by means of a crank pin 146 (FIG. 5) pivotally connected to the link 128 into a single reciprocation of the ram 122.

In order to cause the engagement and disengagement of the auxiliary clutch at the proper time there is mounted on the shaft 14 a cam 148 shown in FIG. 7 and engaged at its periphery by a follower roll 150 mounted at the upper forward end of an arm 152 pivoted upon the stud 68. Also pivoted upon the stud 68 is a slender offset generally horizontal finger 154 extending rearwardly from the stud and urged in a counterclockwise direction by a spring 156. The finger 154 is coupled to the arm 152 by means of a pair of screws 158 passing through enlarged openings in the arm and into threaded openings in a short upstanding arm integral with the finger 154. In order to impart a clutch pin releasing movement to the cam plate 134 in accordance with the cam actuated movement of the arm 152 there is pressed in the finger 154 a pin 160 extending into a slot 161 in the plate 134. Also mounted on the plate 134 is a hook 162 urged into engagement with the pin 160 by a torsion spring 164. The hook 162 is formed with an offset tail portion 166 engageable by a dog 168 on the body 52 for tripping the hook out of engagement with the pin 160 shortly after the body 52 has been coupled to the pulley 32 so that regardless of the position of the arm 152 and the finger 154 the plate 134, under the urging of the tension spring 169, is again urged into engagement with the groove 132 to be in a position to cam the pin 138 out of engagement with the slots 144 at the completion of a single revolution of the clutch body 52.

In order to agitate eyelets in a reservoir 170, FIGS. 1 and 2, to cause them to enter a guideway 172, a cam groove 174 is formed in the inner face of the pulley 32. Engaging the cam groove 174 is a follower roll 176, FIGS. 5 and 7, mounted on a lever in the form of a flat plate 178 pivoted on the stud 76 and connected at its distal end to a generally vertical rod 180, best shown in FIG. 3. The upper end of the rod 180 is pivotally connected to a horizontal forwardly extending arm of a bell crank 182 pivoted on the eyeleting machine frame and having a vertical arm connected to a horizontal link rod 184 having a connection at its forward end with conventional eyelet agitating mechanism in the reservoir 170.

*Work Clamping*

In order to facilitate the holding either of a single article or of a pair of articles in stringing position there is provided in the present machine a novel set of clamping devices illustrated generally in FIGS. 1, 2 and 10. According to the present arrangement the clamps 28 and 29 are opened to receive a pair of articles at the same time that the eyeleting spindle 30 is lowered, by depressing the forwardly extending end of a treadle 190 pivoted upon a pillow block 192 mounted on the floor beneath a bench 194 which supports the operating mechanisms of the machine. At its rearward end the treadle 190 is pivotally connected to a generally vertical link rod 196 (FIG. 2) similarly connected to the rearward end of a pair of spaced apart triangular pivoted plates 198 also shown in FIG. 10. When the rod 196 which is biased downwardly by a spring 197 (FIG. 2) is raised by movement of the treadle, the plates 198 are pivoted on a fixedly supported pin 200, the spindle 30 is depressed and the clamps 28 and 29 are opened.

Connections between the triangular plates 198 and the clamps 28 and 29 include a pivot block 208 shown in FIGS. 19 and 20 and slidably mounted in a slot 210 formed in a cover 212 fixedly supported on a dependent portion of the subframe 100. The cover 212 is connected to the subframe 100 by four screws 214 each passing loosely through an opening in the cover through a spacer bushing 216 and into a threaded opening in the frame so as to provide a space between the frame and the cover for movement of a pair of force equalizing levers 218 and 220 connected respectively to the left clamp 28 and the right clamp 29. For imparting the movement of the plates 198 to the block 208 there is provided a short vertical link 222 pivoted at 224 at its lower end to the plates 198 and at 226 at its upper end to the block 208. The showing in solid lines in FIG. 19 represents a typical article clamping position of the levers 218 and 220 and that in broken lines corresponds to an open, article-receiving position, of the clamps 28 and 29. In order to connect the block 208 to the levers 218 and 220 all three members are slotted and a roll 228 passes through all three slots, extending through the combined thickness of the three members. Thus there is a slot 230 through the thickness of the block 208 and slots 232 and 234 through the thicknesses of the levers 218 and 220 respectively.

The lever 218 is free to turn on a short pivot pin 236 pressed into the depending portion of the subframe 100 and extending into the space between the forward surface of the depending portion and the cover 212. A shaft 238 mounted coaxially with the pivot pin 236 is journaled in the subframe 100 and carries the clamp 28 extending radially and downwardly from its axis while the clamp is in work engaging position. The shaft 238 is connected to receive the movement of the lever 218 by means of a short crank arm 240 secured to the rearward end of the shaft and in turn connected to an arm of the lever 218 by a spacer 242.

The lever 220 is similarly supported but, since it lies ahead of the lever 218, it is mounted with freedom to rotate upon the rearward end portion of a shaft 244 journaled in the subframe 100. The forward end of this latter shaft supports the clamp 29 in radially depending relation. The shaft 244 passes through a suitable opening in the cover 212 and in order to impart to it the rotary motion of the lever 220 there is fixed upon an intermediate portion of the shaft a short crank arm 246 coupled to a commensurate arm of the lever 220 by means of a spacer 248.

It will be seen from the foregoing description and from the showing of FIGS. 19 and 20 that when the treadle rod 196 is raised the roll 228 is lowered from the position shown in solid lines to the position shown in broken lines causing rotation of the levers 218 and 220 through arcs somewhat in excess of 90° thereby imparting corresponding movement to the shafts 238 and 244 and their respective clamps 28 and 29. This ample swing of the clamps 28 and 29 away from the work clamping positions greatly facilitates the introduction and withdrawal of work pieces and corespondingly increases the effective operating speed of the machine. It will also be seen that since the roll 228 is free to ride in the slot 230, the pressure applied by the two clamps is equalized regardless of differences in the thicknesses of the work pieces.

It will later be appreciated that to permit the removal of a pair of articles from the machine after being strung together with a tag in the most advantageous manner, the eyeleting spindle is retracted or lowered to a level below its normal operating position. The lowering of the spindle 30 is accomplished simultaneously with the article clamping function by connections with the triangular plates 198, seen particularly in FIGS. 10 and 14. In normal eyeleting operations the eyeleting spindle corresponding to the member 30 in the present machine is a stationary member supported on a rigid post and there is generally no problem from this fact in the introduction and removal of work pieces. In the present construction, however, since the machine is adapted for tying together two articles, the articles being placed on each side of what would normally be the fixed rigid spindle-supporting post, removal of work pieces at the completion of the operation, particularly when two articles are tied together is greatly facilitated by dropping the eyeleting spindle 30.

The movable support for the eyeleting spindle includes a pedestal 256 secured by a pair of cap screws 258 to the base plate 89 forming a part of the eyeleting machine frame 120. The pedestal 256 provides a guideway in which a slide 260 is retained, the slide providing an adjustable support for the spindle 30. In order to regulate the height of the spindle 30 there is threaded in the bottom of a socket which receives it a heightwise adjusting screw 262, and a radially oriented locking screw 264 is also provided to lock the spindle in position when the correct height has been determined. The slide 260 is formed with a horizontal ear 266 which limits its downward movement and an inverted cup-shaped guard 268 is secured to the upper surface of the ear in a position to cooperate with a pair of sheathing plates 270 and 272 shown in FIG. 15. In addition to serving as a shield, the plates 270 and 272 which are fixed to the pedestal 256 by means of screws 274, also support a spacer block 276 between them. The block 276 has passing through it a pair of threaded holes each engaged by two screws 278 to secure the sheathing plates 270 and 272 to the block. In addition there is a recess formed in the block 276 to receive a gib 280 of T cross section, including a tang 282 which may be adjusted to provide the necessary sliding fit and to compensate for wear. The tang 282 which extends into the recess in the spacer 276 is slotted to receive a pair of cap screws 284 which are threaded into the block to retain the gib in proper adjustment.

For supporting the slide 260 against the thrust of the eyeleting machine ram there is a toggle consisting of a link 286 pivoted at 288 on the pedestal 256 and a second link 290 extending between an intermediate pivot 292 and a pin 294 by means of which the link 290 is pivoted to the base of the slide 260. At an intermediate point on the link 286 there is pivotally connected a pair of rearwardly extending spaced-apart links 296. At their rearward end the links 296 are pivotally connected by a pin 298 to a pair of arms 300 seen in FIGS. 10 and 11, lying outside the plates 198 and also pivoted with the plates at 200. The links 296 are biased rearwardly by a spring 302 stretched between the pin 298 and an ear formed on one of the plates 198. Since the movement of the plates 198 accomplishes both the opening of the clamps 28 and 29 and lowering of the spindle 30 it is necessary to provide isolation between the two functions in the form of indentations 304 in the plates so that the position of the spindle is independent of the thickness of material under the clamps. Accordingly as the plates 198 pivot in a clockwise direction, as seen in FIG. 10, when the treadle 190 is depressed the clamps 28 and 29 first open and then the indentation 304 engages the pin 298 to press the links 296 forwardly. When the treadle is released on the other hand, the links 296 first move to the rear to raise the spindle 30 to eyeleting position and the clamps 28, 29 thereafter clamp even the thickest material for which the machine is intended. During the eyeleting operation the thrust upon the spindle 30 is absorbed by the toggle 286, 290 the intermediate pivot 292 of which lies beyond a line connecting the pivots 288, 294. The link 286 for the purpose of resisting the downward thrust of eyeleting is formed with an integral abutment 306 which engages a stationary surface of the pedestal 256. Forward movement of the links 296 breaks the toggle 286, 290 as the clamps 28, 29 are opened to facilitate withdrawal of the work at the completion of each article stringing cycle.

*Needle and Drive*

For carrying the leading end of a string 310 shown in FIGS. 44 to 46 inclusive, the needle 18 is actuated by a barrel cam 312 mounted on the shaft 14 and shown in FIGS. 17 and 18. The needle 18 is rigidly clamped in an off-set needle carrier 314 formed with an integral shaft 316 journaled in the machine frame and driven through a gear sector 318 also formed integrally with the carrier. Free to rotate with respect to the needle carrier is a needle guide 320 journaled on the needle carrier ahead of the sector 318 and urged by a torsion spring 322 toward the eye of the needle. When the needle is actuated to penetrate a pair of shoes 324 and 326 for example, as shown in FIG. 18, the guide 320 at first moves with the needle until it abuts the clamp 29. Thereafter the needle continues in motion and the guide 320 which is formed with an opening fitting the needle remains stationary during the remainder of the needle stroke but is effective to prevent deflection of the needle especially during initial penetration of the first shoe 324.

For actuating the needle 18 the gear sector 318 is engaged by the teeth of a driving sector 330 cut in the lower end of a generally vertical follower lever 332 pivoted at 334 on a depending ear of the subframe 100, as shown in FIGS. 17 and 18. Between the pivot 334 and the driving sector portion 330 there is mounted on the lever 332 a follower roll 336 engaging the groove of the barrel cam 312 to drive the needle 18 to penetrate and withdraw from the work in proper time relationship during an article stringing cycle of the machine.

At the start of the operating cycle when the treadle 16 is first depressed to lower the rod 84 (FIG. 2) the needle 18 is in the position shown in FIG. 44 and the initial penetrating stroke carries the point of the needle through two articles such as shoes held by the clamps 28 and 29 to a position past that shown in FIG. 45. After the needle 18 has penetrated the work a maximum distance it is withdrawn slightly to form a bulge in the leading end of the string 310 past the eye of the needle. The bulge in the strand is then engaged by the left pincer 20 before the needle is withdrawn from the work.

Left Pincer

For this purpose the pincer 20 is mounted in such a way that it may be raised and lowered, open and closed to grip and release the string and also operated in an orbit about the eyeleting spindle 30 of the machine.

The left pincer 20 comprises a fixed inner jaw 340 formed integral with a slide 342 as best seen in FIG. 31. Cooperating with the jaw 340 is a movable outer jaw 344 pivoted at 346 on the slide 342 and having an upstanding integral operating arm pivotally connected at 348 to a short link 350 which is a part of a toggle for providing adequate string holding pressure between the jaws 340 and 344 the gripping surfaces of which are rearwardly offset as seen in FIGS. 44 and 45. The link 350 is pivoted at 352 to the forwardly extending arm of an L-shaped actuating lever 354 pivotally supported at 356 upon the slide 342. At its rearward end the lever 354 is urged upwardly by a tension spring 358, the effect of the force of the spring being that of closing the jaw 344 against the stationary jaw 340.

In order to permit the pincer 20 to be raised and lowered and to be opened and closed whenever necessary during the operating cycle of the machine the slide 342 is supported in a trunnion block 360 shown also in FIG. 33 and formed with a guideway closed by a pair of short plates 362 for retaining the slide 342. The trunnion block 360 is pivotally supported between the cone points of opposed set screws 364 each threaded in one of the arms of an inverted U-shaped frame 366 and locked by a check nut 368. The frame 366 is formed with an integral tubular portion 370, journaled in the machine frame and is also free to rotate on an operator bushing 372 formed with an enlarged head 374 of generally square cross section. Near the lower end of the bushing 372 there is provided a snap ring 376 which retains the frame 366 so that the frame is free to rotate about the axis of the bushing 372 and moves vertically with the bushing. Passing loosely through the bushing 372 is a pincer opening rod 378 terminating at its lower end in a ball 380 providing a swivel for a shoe 382 which is free to slide on and accommodate to various positions of the pincer actuating lever 354. At its upper end the rod 378 is formed with an enlarged generally square slotted head 384 into the slot of which enters the forward end of a pincer opening arm 386 pivotally connected thereto by a pin 388. For raising and lowering the level of the trunnion block 360 and hence of the pincer 20 the head 374 is connected by a short link 390 to the forward end of a pincer height controlling arm 392, pins 394 and 396 providing pivotal connections between the link 390 and the arm 392 and between the head 374 and the link 390 respectively.

For actuating the arm 392 to raise and lower the pincer 20 there is provided on the shaft 14 a cam 400 the periphery of which is engaged by a follower roll 402, as shown in FIGS. 21, 22 and 24. The follower roll 402 is rotatably supported on an arm 404 secured to the outer end of a generally horizontal shaft 406 which is journaled in ears 408 and 410 integral with the subframe 100. Fixedly supported on the inner end of the shaft 406 is the arm 392 having welded to it an anchor bar 412 to which is connected the upper end of the spring 358 to perform the function of keeping the jaws of the pincer 20 closed. This arrangement of the spring 358 imparts relatively constant gripping force to the pincer 20 regardless of the temporary level of the pincers. There is also provided a second tension spring 414 stretched between the distal end of the arm 404 and an anchor point on the subframe 100 to assist in keeping the roll 402 in engagement with the cam 400. In order to provide a certain degree of adjustment between the level of the pincer 20 and the follower roll 402 a short arm 416 is secured to the shaft 406 and coupled to the arm 404 by a pair of screws 418 threaded into the arm 404 and passing loosely through enlarged openings in the arm 416.

For actuating the arm 386 to depress the rod 378 in order to open the jaw 344 there is provided on the shaft 14 a cam 422 the periphery of which is engaged by a follower roll 424 rotatably supported on a generally vertical follower arm 426 effectively fixed to the outer end of a shaft 428 underlying a portion of the shaft 406 and shown in FIGS. 22 and 24. The shaft 428 is journaled in an inner ear 430 formed integral with the subframe 100 directly beneath the ear 410 and an outer ear 432 also integral with the subframe. The shaft 428 is urged in a counterclockwise direction to bring the follower roll 424 into engagement with the periphery of the cam 422 by means of a spring 434 stretched between the distal end of the arm 426 and a fixed anchor pin on the subframe. In order to provide a certain degree of adjustment between the position of the follower roll 424 and the level of the rod 378 there is an adjustable connection between the arm 426 and the shaft 428 consisting of a short perforated arm 436 secured to the outer end of the shaft 428 and through the perforations of which loosely pass a pair of screws 438 threaded into the follower arm 426, the perforations being sufficiently larger than the outside diameter of the screws to provide necessary adjustment between the roll 424 and the position of the pincer actuating arm 384.

In order to impart to the pincer 20 an orbital movement as indicated in dash lines in FIGS. 21 and 47 and bearing the reference numeral 442, the rearward end of the slide 342 is supported by a ball and socket connection 444 shown in FIGS. 25, 27, 28 and 31. The ball of the connection is in the form of a stud mounted on a crank disk 446 which is driven in a counterclockwise direction, as seen in FIG. 21, by a combination of elements including a cam actuated driving gear sector, a pinion and a unidirectional drive through which the oscillating movement of the sector is translated into rotation of the crank disk 446 in a single direction as will be explained.

The disk 446, as seen more particularly in FIGS. 27 and 28, is adjustably secured to a shaft 448 by means of screws 450 each one threaded into a driving flange 452 pinned to the shaft. The screws 450 pass through arcuate slots in the crank disk 446 so that the disk may be adjusted relative to the driving flange 452 to obtain the correct positioning of the pincer 20 in assembling the machine. The shaft 448 is supported for rotation in a ball bearing 454 the outer race of which is pressed in a cross bar 456, also shown in FIGS. 25 and 26, fixedly supported on the subframe 100 of the machine. Mounted above the shaft 448 and concentric with it is a short stub shaft 458 the upper end of which terminates in an integral pinion 460. The shaft 458 is journaled in an integral ear jutting inwardly from the wall of the subframe 100 and the lower portion of the shaft is hollow and fitted with a bearing 462 in which the shaft 448 is free to rotate.

The shaft 458 is oscillated through the pinion 460 but this oscillating motion is translated into rotation of the shaft 448 in the counterclockwise direction only, as seen in FIGS. 21 and 30. For this purpose the lower end of the shaft 458 is formed with a notch 464 engageable by a pawl 466 to be driven thereby. The pawl 466 is pivoted upon a shoulder screw 468 threaded into a driven flange 470 pinned to the shaft 448 and the pawl is urged into engagement with the notch 464 by means of a tension spring 472 stretched between the distal end of the pawl and an anchor pin on the disk 470.

The construction of the driving connections is such that when the shaft 458 is rotated in a counterclockwise direction, as seen in FIGS. 21 and 30, the notch 464 engages the pawl 466 causing the shaft 448 to be correspondingly rotated. However, when the shaft 458 is rotated in a clockwise direction the notch 464 does not engage the pawl 466 in driving relationship.

In order to assure that the shaft 448 is driven in one direction only there is also provided a locking pawl 478 shown in FIGS. 28 and 29 which engages a notch 480 in the periphery of the crank disk 446. The pawl 478 is pivotally supported on the underside of the bar 456 and is urged into engagement with the periphery of the crank disk 446 by a tension spring 482 stretched between the distal end of the locking pawl and a fixed anchor block welded to the bar 456.

Engaging the pinion 460 to oscillate the shaft 458 is an internal gear sector 484, seen in FIGS. 25 and 26. The gear sector 484 is formed as an integral part of a follower arm 486 pivoted on a slotted strap 488 screwed and doweled to bridge the width of the subframe 100. Support for the follower arm 486 is provided by a pivot pin 490 fixedly retained in an integral hub of the lever and free to rotate in bearings above and below the hub. At an intermediate point along the length of the arm 486 there is provided a follower roll 491 which engages the slot of a barrel cam 492 mounted on the main shaft 14.

The primary functions of the pincer 20 are to descend toward the eye of the needle 18 to grip the bulge in the strand formed by retraction of the needle after penetration of the work pieces and thereafter to place a bight of string about the spindle 30 as shown in FIG. 47. The accomplishment of these functions involves three necessary movements of the pincer 20, controlled in proper timed relationship by the cams 400, 422 and 492, seen in FIG. 21. The raising and lowering of the pincer is effected by the cam 400 which raises and lowers the frame 366 imparting a corresponding movement to the trunnion block 360. The jaw 344 is normally held in engagement with the fixed jaw 340 by the spring 358 but when it is necessary to open the jaw 344, in order to grip or release the string 310, the rod 378 is effective for this purpose by being depressed in the proper timed relationship through connections already described including the cam 422. Finally the orbital movement about the path 442 is imparted to the pincer 20 through a single revolution of the crank disk 446, the revolution originating from the cam 492.

*String Metering*

In order to permit the right pincer 22 to orbit the spindle 30 without unduly stressing the strand or allowing it to slip and to facilitate the removal from the machine of a pair of articles connected together by a string loop it is desired that the length of the loop be somewhat greater than would otherwise be required to bind the two articles tightly against the support for the eyeleting spindle 30. It is also highly desirable, in order to provide a versatile machine that the length of the loop either through a single article or connecting together two articles in a pair, be readily adjustable to suit different types of merchandise and also to accommodate to varying merchandising methods and operations. This function in the present machine is carried out by the strand measuring finger 24 after the needle has been withdrawn and the leading end of the string has been captured by the left pincer 20.

The finger 24 is pivoted at 500, as seen in FIGS. 10 and 14, and formed with an integral driving pinion 502. At its distal end the arm 24 is formed to receive a wire hook 504 through which the string passes after the needle has been withdrawn from the work. By oscillating the arm 24 through a predetermined angle at the proper time during the machine cycle, the requisite quantity of string is reaved through the eye of the needle and made available before the string is severed thus providing the desired size of loop connected to the article.

For actuating the arm 24 there is provided on the shaft 14, as seen in FIGS. 10 and 21, a cam 505. Interposed between the arm 24 and the cam 505 is a set of adjustable connections, now to be described, with particular reference to FIGS. 10 and 12 to 14 inclusive. Contacting the periphery of the cam 505 is a follower roll 506 rotatably supported on an L-shaped offset arm 508 which is in turn pivotally mounted upon a pin 510. The arm 508 and an actuating arm 512 are both supported upon a bracket 514 fixed to the subframe 100, the pin 510 for the arm 508 being pressed in a depending ear of the bracket. For urging the follower roll 506 into engagement with the contour of the cam 505 there is provided a tension spring 516 stretched between the distal end of the arm 508 and an anchor point on the subframe 100. The arm 512 which is slotted to embrace a second depending ear of the bracket 514 is pivoted upon a pin 518 pressed into the ear and the distal end of the arm 512 is pivotally connected to a generally vertical adjustable link 520.

As will be seen, the length of the string loop connected to the article or articles is generally proportional to the amount of movement imparted to the link 520 during the operating cycle of the machine. Since the throw of the cam 505 remains constant there is provided between the arms 508 and 512 an adjustable connection for regulating the extent of motion of the link 520. The adjustable connection comprises a shoulder screw 522 having an enlarged and flattened portion 524. The screw 522 is free to move longitudinally in a slot 526 extending through the thickness of the arm 512 and enlarged at 528 to present a shallow depression into which the flattened portion 524 is received thereby retaining the screw 522 against turning so that it may readily be clamped by a nut 530 when the screw has been located at the necessary position along the length of the slot to produce the desired length of string loop. The arm 508 is formed with a T-slot 532 in dotted lines in FIG. 12 and into which is fitted a slot block 534 pierced to receive a cylindrical extension 536 of the screw 522 rotatable therein.

From the foregoing description of the adjustable connection it will be seen that when the block 534 is adjusted to the extreme right end of the slot 526 close to the follower roll 506 the amplitude of motion of the arm 512 by the cam is at a maximum and a maximum reciprocation is accordingly imparted to the link 520. Conversely, when the block 534 is adjusted to the left of the slot close to the pivot pin 510 the actuating arm 512 and the link 520 receive a minimum motion. The length and placement of the slot 526, as seen in FIG. 13, are such that some movement is imparted to the link 520 in each cycle of the machine and there is accordingly a corresponding movement of the measuring arm 24 to store the minimum quantity of strand required for the orbit of the pincer 22.

The link 520 is formed in two parts so that its length may be readily adjusted to facilitate assembling and for this purpose a pair of clamping screws 538 pass through slots in one of the parts of the link and each screw is threaded into an appropriate opening in the other part. The lower end of the link 520 is pivotally connected to a short arm 540 of a gear sector lever having a hub 542, seen in FIG. 49, pivoted on a shoulder screw 544 secured to the plate 270 which encloses one side of the movable support for the eyeleting spindle 30. Extending forwardly from the pivot provided by the shoulder screw 544 is an arm 546 of the sector lever, the arm being enclosed between the plate 272 and an intermediate plate 548, seen in FIGS. 14 and 49, the plate 548 being formed with an arcuate slot 550 through which the arm 546 is connected to an internal gear sector 552 engaging the pinion 502. Both the sector 552 and the pinion 502 are interposed between the plates 270 and 548, the connection between the arm 546 and the sector being provided by a shoulder rivet 554 which travels in the arcuate slot 550. In order to maintain the sector 552 in engagement with the pinion 502 there is mounted upon the plate 548 a flanged backup roll 556 supported on a shoulder screw 558 fixed on the plate. The roll 556 engages the major diameter and two rabetted edges of the sector 552 to prevent both lateral and radial deflection.

As the arm 24 is actuated in a clockwise direction, as seen in FIG. 14, having engaged the string following the withdrawal of the needle, it is necessary to avoid entanglement of the hook 504 with the string. For this reason there has been provided in the machine a pair of outwardly and downwardly slanted drum members 560, 562, seen in FIGS. 14, 16 and more particularly in FIGS. 47 to 49 inclusive. The path of the hook 504 is in a plane between the drums 560, 562, the forward leg of the string bight formed by the hook being stored on the drum 560 and the rearward leg on the drum 562. As is seen in FIG. 14 the drum 560 and to the same extent the drum 562 extend over 180° about the stud 500 to a point almost directly below the stud to store the string when the arm 24 receives a maximum motion for maximum string measuring. Under conditions of maximum measuring the motion terminates at a point where the string wrapped upon the drums 560, 562 underlies the drums. Accordingly when the direction of motion of the finger 24 is reversed there is a tendency for the string to unwind from the drums and entangle itself about the returning hook 504. In order to avoid this a channel member 564 is supported in bridging relation with the drums and receives the string as the finger 24 commences its withdrawal after measuring the string for a loop of maximum size.

In order to control the movement of the string while operating on goods having a diversity of friction characteristics it is necessary to provide instrumentalities in the machine for applying a limited and constant minimum frictional load to the string while it is being measured and during the return movement of the arm 24 after accomplishing a strand measuring operation. It is also necessary that the string be retained while the pincers 20 and 22 are forming bights about the eyeleting spindle 30 preparatory to connecting the ends of the string together in tell-tale relationship by means of an eyelet. For this purpose there is included in the machine a pair of controllers 566 and 568, seen in FIGS. 47 and 48, which engage the forward and rearward leg respectively of the bight formed by the hook 504. The controllers 566, 568 being one piece are secured by a single screw shown at 570 (FIG. 14) threaded into a rearward face of the pedestal 256. The controllers 566, 568 include a pendant shank 572 through which the fastening screw 570 is inserted, a loop 574 and a stem 576. As seen in FIGS. 16, 47 and 48 each leg of the string bight is guided at the intersection of the loop 574 and the stem 576 which enters the upper surface of the pedestal 256 immediately to the rear of a groove 578 in the pedestal 256, which provides clearance for the passage of the needle. Cooperating with the controllers 566, 568 is a friction 580 secured by a screw 582 (FIG. 16) threaded into a spacer block 584 bridging the gap between the plates 270, 272. The friction 580 is formed of wire with two feet 586 each toeing in toward the eyeleting spindle 30. When a bight is formed by the action of the hook 504 friction is applied to each leg between the foot 586 and the related directing surface of the controller as may be seen clearly in FIG. 48. The nature of the engagement between the string and the control instrumentalities 566, 568 and 580 is such that although these instrumentalities are made of wear resistant materials these elements are expected to require frequent replacement and have accordingly been designed for ease of removal.

*Right Pincer*

As the needle withdraws sufficiently to clear the article held by the clamp 29 the pincer 22 moves toward the string 310 and after the stroke of the string measuring arm 24 is completed the pincer 22 grips the string firmly before it is severed by the string severing device 26. The functions of the pincer 22 comprise controlling the strand so that it may be cut by the severing device 26 and further looping the trailing end of the strand in an orbital path indicated at 588 in FIGS. 21 and 47. The pincer 22 resembles to a certain extent the pincer 20 but to the extent that its function is somewhat simplified, has fewer working parts and a simpler support.

The pincer 22, as shown particularly in FIGS. 41 and 42, comprises a fixed inner jaw 594 formed as an integral part of a horizontal slide 596 and a movable outer jaw 598 which cooperates with the fixed jaw for gripping the strand between the eye of the needle 18 and the article such as the shoe 324 shown in FIG. 46, mounted to the right of the pedestal 256 and engaged by the clamp 29. Since the pincer 22, as seen in FIGS. 47 and 48, engages the string between gripping surfaces extending laterally from the slide 596 and the direction of approach to the string is horizontal, there is no need during the operation of the machine for raising and lowering the level of the pincer 22 and accordingly the forward support of the slide 596 is considerably simplified when compared to that of the left pincer. The slide 596 is free to move longitudinally in a guideway provided in a trunnion block 600, pivotally supported between the cone points of set screws 602 threaded into a yoke 604 and locked in position each by a check nut 606, as shown in FIG. 34. The yoke 604 is formed with an integral tubular shank 608 journaled in a bearing-carrying, externally-threaded, vertically-adjustable bushing 610 which is positioned vertically to determine the operating level of the pincer 22 during the assembly of the machine and is thereafter locked in place by a set screw 612 threaded in an integral ear of the subframe 100. Surrounding the upper end of the shank 608 is a thrust washer 614 retained by a snap ring 616 fitting an appropriate groove in the shank 608 to provide the necessary axial fit between the shank and the bushing 610.

To cause the opening of the jaw 598 there is mounted on a fixed pivot 618 in the slide 596 a three-armed lever including an irregularly bent rearwardly extending spring connecting arm 620 to the rearward end of which is coupled a tension spring 622 stretched between the arm and a fixed anchor point on the subframe 100. The three-armed lever also includes a forwardly extending arm 624 having a pivotal connection at 626 with a short horizontal link 628 which extends forwardly to a pivot 630 connecting the latter to the movable jaw 598. In turn the jaw 598 is fulcrumed at 632 on the slide 596 so that when the three-arm lever is moved in a clockwise direction about the fulcrum 618, as seen in FIG. 41, causing the pivot 626 to rise with a rearward component of motion, the pivot 630 is also rotated in a clockwise direction about the fulcrum 632 causing the jaw 598 to be opened. When the arm 620, however is urged upwardly by the force of the spring 622, the pivot 626 approaches a position of alinement with the fulcrum 618 and the pivot 630 thereby causing the string to be engaged with considerable force between the jaws of the pincer 22.

For controlling the opening of the jaws of the pincer 22 the three-armed lever fulcrumed at 618 also includes a relatively short horizontal arm 634 extending rearwardly from the fulcrum and into a slot 636 formed in the slide 596. The distal end of the arm 634 is formed with a depressed surface at 638 and the rearward end of the slot 636 is formed to provide an abutment engageable by the surface 638 to limit the counterclockwise movement of the three-armed lever under the force of the spring 622. For depressing the arm 634 to cause the opening of the pincer 22 its upper surface is engaged by a slide block 640 captive on a ball 642 integrally formed at the lower end of an operating rod 644. The block 640 is of generally T-shaped cross section, its lower portion, as seen in FIG. 41, being sized to enter the enlarged portion of the slot 636 and its upper portion being formed to provide a pair of laterally extending stopping ears 646 which limit the movement imparted by the rod 644 to the three-armed lever.

Motion is imparted to the rod 644 whenever necessary in the operation of the machine to cause the opening of the pincer 22 by connections with an enlarged integral head 648 which is slotted to receive a generally off-set arm 650 of a composite bell crank also shown in FIGS. 34 and 35. The head 648 carries pressed in it a pivot pin 652 passing loosely through the forward end of the arm 650 to provide a pivotal connection between the rod 644 and the arm 650.

The arm 650 is pinned to a horizontal shaft 654 shown in FIGS. 21, 34 and 35. The shaft 654 is rotatably supported in a pair of inwardly projecting integral ears 656 and 658 of the subframe 100 and supports in adjustably fixed relationship at its outer end a follower arm 660 upon which is rotatably mounted a follower roll 662 engaging the periphery of a pincer opening cam 664. The arm 660 is urged in a counterclockwise direction about the axis of the shaft 654 to maintain the follower roll 662 in engagement with the periphery of the cam 664 by a tension spring 666 stretched between the distal end of the arm 660 and a fixed anchor point (not shown) on the subframe 100. The arm 660 is mounted on the shaft 654 so as to provide a range of adjustments between the position of the follower roll 662 and the block 640 which, by depressing the arm 634, causes the pincer 22 to be opened. Connecting the arm 660 to the shaft 654 is a finger 668, fixedly depending from the outer end of the shaft and perforated loosely to receive a pair of clamping screws 670 which are threaded into the arm 660 and tightened to retain the arms 650 and 660 in proper relative positions once the required relationship has been determined in assembling the machine.

As in the case of the left pincer 20 the forward support provided for the right pincer 22 is such that the slide 596 upon which the right pincer is supported may receive a crank motion coupled to the rearward end of the slide to cause movement of the pincer over the generally elliptical path 588 of FIGS. 21 and 47. For imparting the required motion to the rearward end of the slide 596 there is provided a combination of a pinion and sector and a one-way drive bearing considerable similarity to the corresponding elements employed for actuating the left pincer 20. The slide driving elements for the right pincer include a crank disk 672 shown fragmentarily in FIG. 41 as well as in FIGS. 38 to 40 inclusive. Fixedly mounted upon the disk 672 is a ball stud 674, the ball of which is encompassed by a ball socket 676 secured to the rearward end of the slide 596 for coupling the slide to the crank disk.

Referring now more particularly to FIGS. 38 to 40 inclusive, the crank disk 672 is adjustably supported upon the lower end of a short vertical shaft 678 which also carries overlying the disk 672 a smaller fixed driving disk 680 to which the crank disk 672 is adjustably coupled by means of three screws 682 each passing loosely through a slot 684 in the crank disk and into engagement with the threads of a tapped hole in the driving disk. The shaft 678 is rotatably supported in a ball bearing 686 having an outer race pressed in a cross bar 688 which bridges the width of the subframe 100 and is fixedly secured to the frame. Arranged concentric with the shaft 678 and journaled in an integral ear of the subframe 100 is a driving shaft 690 the upper end of which terminates in an integral pinion 692. At its lower end the shaft 690 is hollow and has fitted in it a pressed bearing 694 in which is journaled the upper end of the shaft 678. The shaft 690 is retained against vertical movement by a snap ring 696 and the outside diameter below the snap ring is formed with a driving notch 698 engageable by a pawl 700 so that rotation of the shaft 690 in a clockwise direction, as seen in FIGS. 21 and 40, may be imparted to the shaft 678. The pawl 700 is pivotally supported on a shoulder screw 702 passing loosely through the pawl and threaded into a flange 704 pinned to the shaft 678. The pawl 700 is urged into engagement with the notch 698 by a tension spring 706 connected between the free end of the pawl and an anchor pin 708 in the flange 704.

In order to prevent rotation of the crank disk 672 in a counterclockwise direction, as seen in FIG. 39, there is provided a locking pawl 710 pivotally supported upon a shoulder screw 712 passing loosely through the pawl and threaded into a tapped hole in the bar 688. The pawl 710 is supported beneath the plate 688 and urged by a tension spring 714 toward the periphery of the crank disk 672 to engage a notch 716 cut in the crank disk to prevent rotation of the disk in a counterclockwise direction. The spring 714 is stretched between an anchor point fixed on the bar 688 and the free end of the pawl 710.

For oscillating the shaft 690 an arrangement similar to that for the left pincer is also provided for the pincer 22 and includes a sector 718 pivotally supported on a pin 720 passing loosely through an integral hub of the sector and pressed into a strap 722 which bridges the width of the subframe 100, as seen in FIGS. 36 and 37. The free end of the sector 718 is formed with a depending skirt in which are cut internal gear teeth 724 engaging the teeth of the pinion 692. At an intermediate point along the sector there is rotatably supported a follower roll 726 which engages the track of a barrel cam 728 carried by the shaft 14. The track of the cam 728 has the necessary configuration to impart through the unidirectional driving connections already described a movement to the pincers 22 in a counterclockwise direction, as seen in FIGS. 21 and 47, about the generally elliptical path 588.

*String Severing*

After the string 310 has been gripped by the right pincer 22, as shown in FIGS. 46 and 47, the string severing device indicated generally at 26 and illustrated in detail in FIGS. 41 and 43, engages the string ahead of the eye of the needle 18 to sever that part of the string which is passed through the article or articles from the supply of string leaving a sufficient length beyond the eye of the needle for the next article stringing operation. The string severing device comprises a relatively fixed scissor blade 734 upon which is pivoted at 736 a movable blade 738. Both the blades 734 and 738 are arranged to be moved forwardly a short distance from the solid line to the dot and dash line positions, as shown in FIG. 43, to engage the string prior to severing it. However, the severing action is achieved entirely by movement of the blade 738 with the blade 734 remaining stationary.

The blade 734 is fitted in a groove in the forward end of a carrier 740 the rearward end of which is bolted to the top of a slide 742 slidably mounted in a guideway 744 of T-shaped cross section. Fixed to the top of the slide 742 is a slotted block 746 in the slot of which is received the free end of an arm 748 comprising a part of the advancing mechanism for the slide 742. The arm 748 is pinned to a short vertical shaft 750 journaled in an integral ear of the subframe 100 and also carrying fixed to its upper end a short arm 752 which together with the arm 748 and the shaft makes up the composite bell crank through which the slide 742 is advanced and retracted. The distal end of the arm 752 is coupled by means of a short link 754 to the forward end of a follower arm 756 pivoted on a pin 758. Between its pivot and its point of connection to the link 754 the arm 756 carries a follower roll 760 which engages a side of the gear 102 on the main shaft 14, as seen in FIGS. 21 and 36. The side of the gear 102 is formed with a lateral lobe 762 which causes the follower roll 760 to move to the left and the carrier 740 to advance from the solid line to the dot and dash line position at the proper time in the operating cycle of the machine. In order to keep the roll 760 in contact with the side of the gear 102 there is stretched between the distal end of the arm 756 and an anchor stud 764 on the subframe 100 a spring 766, seen in FIG. 43.

The connections already described cause the carrier 740 to be advanced and the advancing movement of the carrier causes a string cutting movement of the blade 738. For this purpose the blade 738 is formed with a laterally extending integral projection 770 terminating in an upwardly bent tab 772 to which is connected one end of a tension spring 774 the other end of which is secured to an anchor stud 776 on the subframe 100. The spring 744 maintains the movable blade 738 to open position, a downwardly extending integral tab 778 engaging the edge of the carrier 740 to limit the open position of the movable blade. For imparting a closing motion to the blade 738 as the slide 742 is advanced there is fixedly supported on the subframe 100 an abutment finger 780 which is engaged by the projection 770 to cause rotation of the blade 738 in a clockwise direction about its pivot 736 as the carrier 740 advances thereby severing the string.

Operation and Time Chart

Before the machine is operated in accordance with the time chart it is first necessary that the work be placed in operating position manually and that a perforated tag such as that indicated at 782 in FIG. 50 be placed in position with the perforation about the eyeleting spindle 30. For this purpose the treadle 190 is depressed to raise the treadle rod 196, as shown in FIG. 2, causing the clamps 28 and 29 to be opened and the eyeleting spindle 30 to be lowered. Assuming that the stringing operation is to connect a pair of shoes such as 324, 326 a guide plate 784, shown in FIG. 1, is provided on each side of the pedestal 256 to serve in guiding the positioning of the shoes while the clamps are open. With the shoes in place the treadle 190 is released allowing the clamps 28 and 29 to engage the shoes and hold them in position until the stringing operation is completed. It has already been pointed out that the lowering of the eyeleting spindle 30 is to facilitate the removal from the machine of two articles closely tied together. Accordingly the placement of the tag 782 on the spindle 30 need not be accomplished while the spindle 30 is down and the clamps open but an appropriate tag may be placed upon the spindle after a pair of shoes has been clamped in operating position. Typically the tag 782 would bear size and price information relating to the specific article to which it is to be connected.

The operation of the machine will now be summarized by describing a complete operating cycle with reference to the time chart (FIG. 54) in which is shown in the uppermost graph indicated by the reference numeral 786, the movement of the needle 18 commencing immediately as the shaft 14 begins its rotation, reaching its deepest penetration at the 87° point of the machine cycle before being partially retracted at the 100° position of the main shaft, the starting position and the position reached at the 100° point being shown in FIGS. 44 and 45 respectively. As the needle begins to move toward the pedestal 256 the left pincer 20 moves toward the position shown in FIG. 45 in which it grips the bulge of the string 310 formed by the retraction of the needle 18, as is indicated by the second graph bearing the reference numeral 788. The downward movement of the pincer 20 terminates at the 70° position of the main shaft. At this time the pincer 20 is partially open from the zero position of the shaft 14 and continues to open until the 100° position as is indicated by the third graph bearing the reference character 790. Starting at the 30° position of the shaft 14 and continuing to the 90° position, as is indicated by the next graph bearing reference numeral 792 a return movement is imparted to the sector 484 but this has no effect upon the position of the pincer 20 in its orbit since the prior operation has terminated in the dotted line position, shown in FIG. 45, in which the pincer is ready to grip the bulge. Thus as the 90° position of the shaft 14 is reached the pincer 20 is properly positioned to receive the bulge in the strand vertically, as shown by the graph 788 which represents the movement imparted by the cam 400 and horizontally as shown by the graph 792 representing the orbital movement imparted by the cam 492. The pincer jaws are almost fully opened, the opening movement imparted by the cam 422 being completed at the 100° position of the shaft 14. Between the 87° and the 100° positions of the shaft the needle receives a retracting motion from the cam 312 as shown in the graph 786 to form the bulge which enters the pincer 20, and thereafter the needle continues to dwell in slightly retracted position until the 135° position of the shaft is reached. During this period of dwell the pincer 20 is completely closed at the 120° position and having firmly gripped the bulge in the string 310 begins to rise at the 120° position to the level in which it is shown in FIG. 46, reaching the upper level at the 150° position as shown in the graph 788, and maintaining the higher level for the remainder of the machine cycle.

With the string 310 firmly gripped by the left pincer 20, as shown in FIG. 45, the needle dwell is terminated at the 135° point in the operating cycle of the machine, as shown by the graph 786, the needle commencing at the 135° point to withdraw and the withdrawal of the needle back to the starting position being completed at the 195° point. As the tip of the needle 18 is withdrawn past the plane of the metering hook 504 a strand metering movement is imparted to the hook, as indicated by the next graph designated at 794, the strand metering motion commencing at the 165° point and terminating at 215° of the machine cycle. During the latter part of the strand measuring motion the right pincer 22 which has remained open since the end of the previous machine cycle, as indicated by a graph 796, in FIG. 54, commences at the 150° position of the cam shaft to move from the dash line position to the solid line position shown in FIG. 47 in order to grip the string 310 as the strand metering movement of the hook 504 is near completion. The movement of the right pincer toward the string engaging position is shown in a graph indicated at 798 in the time chart and is completed at the 190° position of the main shaft. Beginning at the 205° position the right pincer begins to close as indicated in the graph 796 and the closure of the pincer into firm gripping engagement with the string 310 is completed at the 230° position of the main shaft.

As the right pincer 22 grips the string firmly the strand severing device 26 is in motion from the solid line to the dash line position shown in FIG. 43 in which latter position it completes a strand severing operation. The forward motion of the strand severing device 26 commences at the 195° and terminates at the 240° position of the main shaft 14. It will be appreciated also, from the detailed description of the construction of the strand severing device 26, that only the latter part of the forward movement is effective for imparting a closing motion to the blade 738, the strand severing action being therefore completed between 230 and 240 degrees of the machine cycle as indicated by a graph 800 on the time chart. As shown by the graph 800 after having moved forward and completing its string severing operation at the 240° position the strand severing device 26 is retracted bodily to its rearward position shown in full lines in FIG. 43, the fully retracted position being reached at the 285° position of the shaft 14 in which retracted position the strand severing device remains for the remainder of the operating cycle.

In preparation for the orbital movement of the right pincer following the severing of the strand the left pincer has been moved starting at the 150° position and terminating at the 200° position of the main shaft through a part of its path in a clockwise direction, as seen in FIG. 47, from the dash line position of the pincer 20 to the full line position, in order to place a bight from the leading end of the string 310 around the eyeleting spindle 30. After the string has been severed as already explained the right pincer 22 travels in a counterclockwise direction from the full line position shown in FIG. 47 to the position indicated in FIG. 48, the counterclockwise motion being over the elliptical path 588 and being accomplished during the rotation of the main shaft 14 from the 250° to the 300° positions. In the graph 798 the interval between the 20° and 90° positions is a return of the arm 718 and has no effect upon the position of the pincer 22. Starting at the 215° position and as indicated by the graph 794 the strand metering hook is returned to its starting point which it reaches at the 265° position, the return motion of the hook 504 providing whatever slack string is necessary for orbital movement of the right pincer 22. With both ends of the string 310 lying in the positions shown in FIG. 48 the auxiliary clutch comprising the body 52 is coupled to the bull wheel 32 by the action of the cam 148. As shown by a graph 802 of FIG. 54 at the 290° position of the main shaft 14 the cam plate 134 is fully withdrawn allowing the bolt 136 to move into engagement with one of the slots 144. The body 52 of the auxiliary clutch makes a single revolution with the bull wheel 32, the periphery of the cam 148 being so formed that toward the end of the single revolution of the bull wheel the plate 134 is allowed to re-engage the bolt 136 to decouple the clutch body from the bull wheel, the eyeleting operation having been completed by the time that the 320° position of the main shaft 14 is reached.

Referring now to a graph indicated at 804 in FIG. 54, the control of the main clutch comprising the body 44 and the bolt 60 as effected by the cam 106 and the treadle 16 as will now be explained. At the zero point in the machine cycle, the treadle has been sufficiently depressed to rock the plate 66, shown in FIGS. 4 and 5, out of engagement with the shoulder on the bolt 60 so as to permit the bolt to engage the slot 64 to cause the shaft 14 to commence rotating in a counterclockwise direction, as seen in FIG. 4. During the first 35° of rotation of the shaft 14 the periphery of the cam 106 causes the plate 66 to be moved farther away from the bolt 60 than the initial treadle imparted motion necessary to release the bolt into engagement with a slot in the bull wheel, so that the tail 94 of the hook 91 is removed from the path of the dog 104 during the first four revolutions of the bull wheel. The periphery of the cam 106 is so formed that the plate 66 is maintained in this position most remote from the axis of the body 44 and with the tail 94 out of the path of the dog 104 until the latter part of the machine cycle is reached. Starting at the 265° position of the main shaft 14 the cam 106 is formed so as to allow the plate 66 to start returning toward its bolt engaging position. Sometime before the plate 66 reaches its fully seated position at 340° of the machine cycle it has already been effective to start withdrawal of the bolt 60 from engagement with the slot 64 and the tail 94 of the hook 91 has reached a position in the path of the dog 104. Since the machine cycle takes place in a short period of time, less than 1.5 seconds, it is likely that the foot of the operator will remain in machine starting engagement with the treadle 16 for a period of time longer than the entire machine cycle. The dog 104 is therefore effective during the final revolution of the bull wheel 32 which because of the reduction ratio from the bull wheel to the shaft 14 consumes only 72° of the machine cycle, to engage the tail 94 causing the hook 91 to move out of engagement with the pin 88 thereby releasing the treadle rod 84. After the pin 88 is released the treadle rod 84 remains in the position determined by the plate 89 and the pin 88 remains in the slot 90 but the treadle has no effect upon the position of the plate 66 until the pin 88 is reengaged by the hook 91 when the treadle 16 is later released by the operator. The withdrawal of the bolt 60 is completed before the 340° position of the shaft 14 is reached and the loading upon the shaft is such that it completes its full revolution and the machine is thereafter in condition to be started by the treadle 16 on its next operating cycle. During the last 40° of rotation of the shaft 14 the pincers 20 and 22 are opened and in addition the left pincer 20 is moved a slight distance in its orbit during the last 30° of main shaft rotation. The opening of the pincers shown by the graphs 790 and 796 facilitates the removal of a pair of tied-together articles which are released from the clamps 28 and 29 by depressing the treadle 190.

*Product*

In FIG. 50 there is shown the pair of shoes 324, 326 connected together by the length of string 310, the separation between the two shoes due to the length of the loop being near the minimum which can be reasonably produced by the machine. As seen in FIGS. 51 and 52 a bight formed of the leading end of the string 310 is down in engagement with the upper surface of the tag 782 and surrounds the barrel of an eyelet 806. Close to the head 808 of the eyelet is a bight formed from the trailing end of the length of string and having a cross over point with the leading end bight portion under the head of the eyelet, the cross over points in the two end portions of the length of string defining between them the length of loop which passes through the shoes 324, 326. With this arrangement it has been found that the holding power of the combination of eyelet and string is essentially limited by the tensile strength of the string whether a pull is applied to either shoe or to the free end of the tag 782. In addition, the eyelet, by distributing the load over a substantial area of the hole through which it passes in the tag, greatly reinforces the tag against tearing. Further, since the spring and the tag are alined substantially in a common plane, there is a greatly reduced tendency for the eyelet to tear out of the tag when a pull is applied to the tag in withdrawing the shoes from a bin in a retail outlet, for example.

Shown in FIG. 53 is an alternative method of tying a pair of shoes 810, 812 together by means of a length of string 310. In this illustration, however, although an eyelet 806, 808 is employed to connect the ends of the string together in the same way as that illustrated in FIGS. 50 to 52 a single strand passes through an opening 814 in a tag 816 thereby gaining the same tell tale relationship obtained in the preferred mode of operation depicted in FIGS. 50 to 52, but without having the advantage of re-enforcing the aperture 814 of the tag against tearing. The re-enforcement aspect can sometimes be dispensed with by utilizing a tag having a re-enforcing ring about the perforation, such tags being readily available at a premium price. In achieving the product of FIG. 53 the tag 816 is positioned inside the shoe 812 under the clamp 29 as the machine is loaded preparatory to operation. For convenience a target may be built into the clamp 29 so that the perforation 814 may readily be alined with the path of the needle 18.

Having thus described our invention what we claim as new and desire to secure by Letters Patent of the United States is:

1. A machine for stringing an article comprising receiving means for the article, means for passing a length of flexible strand from a supply through the article, means for severing the length of strand from the supply, means for bringing together the two ends of the length of strand, and means for thereafter clinching an eyelet thereby to secure together the two ends in tell-tale relationship.

2. A machine for stringing an article comprising treadle operated means for clamping the article in stringing position, an eyeleting spindle, means for passing a length of flexible strand from a supply through the article, means for severing the length of strand from the supply, individual means for forming a loop about the spindle from each end of the severed length, and means for thereafter clinching an eyelet on the spindle thereby to secure together the two ends in tell-tale relationship.

3. A machine for stringing articles comprising means defining stringing positions for a pair of articles in spaced relation, means for passing a length of flexible strand from a supply through the articles, means, between the articles, for storing a quantity of strand, means for severing the length of strand including the stored quantity from the supply, means for bringing together the two ends of the length of strand, and means for thereafter clinching an eyelet thereby to secure together the two ends in tell-tale relationship.

4. A machine for stringing articles comprising a post having a pair of spaced apart stationary article supporting surfaces, a pair of clamping members each associated with one of the supporting surfaces, means for applying balanced forces to the clamping members for holding in stringing position an article of a pair between each member and its associated surface in a stringing position, means for passing a length of flexible strand from a supply through the articles, means for severing the length of strand from the supply, means for bringing together the two ends of the length of strand, and means for thereafter clinching an eyelet thereby to secure together the two ends in tell-tale relationship.

5. A machine for tagging an article comprising an eyelet spindle, a depressible support for the spindle, clamping means for holding an article in stringing position, a treadle, connecting means between the support and the treadle and between the clamping means and the treadle for simultaneously opening the clamping means and lowering the spindle when the treadle is depressed, means for passing a length of flexible strand from a supply through the article, means for severing the length of strand from the supply, means for bringing together the two ends of the severed length of strand around the spindle, and means for thereafter clinching an eyelet on the spindle thereby to secure together the two ends in tell-tale relationship.

6. A machine for stringing articles comprising means defining stringing positions for a pair of articles in spaced relation, means including a curved eye-pointed needle for passing a length of flexible strand from a supply through the articles, means for providing a measured quantity of strand between the two articles by reaving the strand through the eye of the needle once the needle has been withdrawn from the articles, means for severing the length of strand from the supply, means for forming opposed loops from the ends of the length of strand and positioning the loops to be interconnected by an eyelet and means for thereafter clinching the eyelet interconnecting the two loops thereby to secure together the two ends in tell-tale relationship.

7. The machine according to claim 6, further comprising variable actuating means for the means for providing the measured quantity of strand to provide a predetermined separation between the articles.

8. A machine for stringing an article comprising a spindle, receiving means for the article, a curved eye-pointed needle, means for oscillating the needle to carry during its movement in one direction the leading end of a flexible strand through the article and thereafter to withdraw while reaving the flexible strand through the eye of the needle, means including a first pincer for gripping the leading end of the strand at the end of the motion of the needle in its first direction, means including a second pincer for gripping the strand between the article and the eye of the needle after the needle has been withdrawn from the article, means for severing the strand between the gripping means and the eye of the needle, means for actuating the pincers to lay a loop from each end of the severed length of strand about the spindle, and means for thereafter securing together the two ends.

9. A machine for stringing together a pair of hollow, open-topped articles each having an upper edge comprising means for receiving the articles in spaced apart stringing positions, means including a curved eye-pointed needle for passing the leading end of a flexible strand from a supply through a single wall below the upper edge in each of the two articles, means for providing a measured quantity of the flexible strand between the articles, severing means for cutting the strand between the articles and the supply, means for bringing together the two ends of the severed length of strand, and means for thereafter clinching an eyelet thereby to secure the two ends in tell-tale relationship.

10. A machine for stringing an article comprising means for clamping the article in stringing position, an eyeletting spindle, means for passing the leading end of a flexible strand from a supply through the article including a curved eye-pointed needle, cam operated means for actuating the needle to penetrate the article, to retract thereby forming a bulge in the leading end of the flexible strand and thereafter to withdraw completely to its starting position, a first pincer, means for opening the pincer to grip the bulge, vertically movable pincer supporting means, means for imparting an orbital movement to the first pincer to form a bight about the spindle, a second pincer, opening means for the second pincer to grip an intermediate portion of the strand, means for imparting an orbital movement to the second pincer thereby placing a second bight about the spindle and defining a closed loop through the article, means for severing the flexible strand, and means for securing the two bights of the strand together in tell-tale relationship.

11. An article stringing machine comprising receiving means for the article, eyeletting spindle, means for passing the leading end of a flexible strand through the article, means for forming a closed loop of strand extending through the article, and having ends at the spindle, and means for clinching an eyelet on the spindle thereby to secure the ends of the loop in tell-tale relationship.

12. A machine for tagging pairs of articles together comprising receiving means for receiving and holding the two articles in spaced relationship, means including a curved eye-pointed needle for passing the leading end of a flexible strand through the two articles, means for thereafter gripping the leading end of the strand, means for providing a measured quantity of thereaded strand between the two articles, means for forming in the strand a closed loop passing through the two articles and including the measured strand, and means for binding the loop with a clinched eyelet.

13. A machine for connecting a tag to an article by a loop of flexible strand comprising receiving means for the article, an eyeletting spindle upon which the tag may be impaled, means for passing the leading end of the flexible strand through the article, means for gripping the leading end of the strand, means for thereafter providing a measured quantity of the strand, including a strand measuring arm, an actuating cam, a follower arm, an operating arm, and an adjustable connection between the follower arm and the operating arm, means for severing the strand, means for gripping the trailing end of the flexible strand and for looping it about the eyeletting spindle, means for connecting the looped portion of the strand to the leading end portion of the strand thereby forming a closed loop extending through the article, and means for permanently securing the ends of the closed loop to the tag by a clinched eyelet.

14. A machine for connecting a tag to an article by a flexible strand comprising an eyeletting spindle, a depressible support for the spindle, treadle actuated clamping means for retaining the article in stringing position, means for passing the leading end of a flexible strand from a supply through the article including a curved eye-pointed needle, a pincer, means for imparting an article penetrating movement to the needle and for thereafter partially withdrawn the needle to form a bulge in the strand preparatory to withdrawing the needle completely from the article, means for opening the pincer, means for lowering the open pincer to grip the bulge and for thereafter raising the pincer, means for imparting an orbital movement to the pincer in its raised position to form a bight about the spindle, means for providing a measured quantity of strand, means for gripping the strand between the eye of the needle and the article after the quantity of strand has been measured and for imparting an orbital movement to the gripped portion to lay a second bight of strand about the eyeleting spindle, and means for clinching an eyelet to secure the two bights of strand together.

15. A machine for connecting a tag to an article by a flexible strand comprising means including an eye-pointed needle for passing the leading end of a flexible strand through the article, means for gripping the leading end of the strand after it has been passed through the article, adjustable means for measuring a predetermined quantity of strand to be thereafter employed in forming a closed loop passing through the article and connected to the tag, means for gripping the strand between the article and the supply after the quantity of strand has been measured, means for serving the strand between the gripping means and the eye of the needle, means for bringing together the two ends of the severed length of strand to form a closed loop, and means for clinching an eyelet securing the two ends of the closed loop together.

16. A machine of claim 15 further characterized in that the strand serving means includes a supporting slide, a fixed blade and a movable blade on the slide, cam actuated connections for moving the slide and the blades toward the strand and an abutment engaged by the movable blade while moving toward the strand for urging the movable blade into strand severing relationship with the fixed blade.

17. The machine of claim 15 further characterized in that the means for gripping the leading end of the strand includes a pincer, a slide upon which the pincer is supported, a vertically movable support for the slide, and a crank drive for imparting movement to the slide in its support.

18. The machine of claim 15 further comprising a spindle upon which the tag may be impaled and independently cam-actuated means for imparting to each pincer an orbital movement to form a bight of its related end of the servered length of strand about the spindle before the eyelet is clinched.

19. A machine for stringing an article comprising receiving means for the article, means for passing a length of flexible strand through the article, means for severing the length of strand from the supply, means for bringing together the two ends of the length of strand, means for clinching an eyelet securing the two ends together, and means including a single main cam shaft for actuating the aforementioned means in predetermined time relationship.

20. The machine of claim 19 further comprising a driving motor and a treadle controlled clutch for coupling the main cam shaft to the driving motor.

21. The machine of claim 20 further comprising a second clutch means for powering the eyelet clinching means, and control means for engaging the second clutch means at the proper time during the operating cycle of the machine.

22. An article stringing machine comprising means for receiving and holding the article in stringing position, means for passing the leading end of a flexible strand through the article, means for providing a measured quantity of strand to be included in a closed loop passing through the article, means for forming the loop by superposing in eyelet receiving relationship the leading end portion and another portion spaced along the length of the strand from the leading end, and means for clinching an eyelet thereby to fasten the previously formed loop.

References Cited in the file of this patent

UNITED STATES PATENTS

| | | |
|---|---|---|
| 1,423,250 | Parkinson | July 18, 1922 |
| 2,503,809 | Eastman | Apr. 11, 1950 |
| 2,911,928 | Burke | Nov. 10, 1959 |